(12) United States Patent
Han et al.

(10) Patent No.: US 11,825,400 B2
(45) Date of Patent: Nov. 21, 2023

(54) METHOD AND APPARATUS FOR SUPPORTING TRANSFER OF MOBILE EDGE COMPUTING IN WIRELESS COMMUNICATION SYSTEM

(71) Applicant: Samsung Electronics Co., Ltd., Suwon-si (KR)

(72) Inventors: Yoonseon Han, Suwon-si (KR); Sunghoon Kim, Suwon-si (KR); Hoyeon Lee, Suwon-si (KR); Kisuk Kweon, Suwon-si (KR); Jungshin Park, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 17/282,874

(22) PCT Filed: Sep. 25, 2019

(86) PCT No.: PCT/KR2019/012458
§ 371 (c)(1),
(2) Date: Apr. 5, 2021

(87) PCT Pub. No.: WO2020/071681
PCT Pub. Date: Apr. 9, 2020

(65) Prior Publication Data
US 2021/0352564 A1    Nov. 11, 2021

(30) Foreign Application Priority Data

Oct. 5, 2018 (KR) .................. 10-2018-0119321
Nov. 5, 2018 (KR) .................. 10-2018-0134449
Feb. 15, 2019 (KR) .................. 10-2019-0017967

(51) Int. Cl.
*H04W 40/24*        (2009.01)

(52) U.S. Cl.
CPC ................. *H04W 40/248* (2013.01)

(58) Field of Classification Search
None
See application file for complete search history.

(56) References Cited

U.S. PATENT DOCUMENTS 8,432,872 B2    4/2013   Swaminathan
9,794,107 B2   10/2017   Gaglianello et al.
(Continued)

FOREIGN PATENT DOCUMENTS

CN       107592331 A      1/2018
CN       107888498 A      4/2018
(Continued)

OTHER PUBLICATIONS

Huawei et al., TS 23.501: AF response in 1-15 AF influence on traffic routing, S2-177386, Oct. 23-27, 2017, Ljubljana, Slovenia.
(Continued)

*Primary Examiner* — Brian S Roberts
(74) *Attorney, Agent, or Firm* — Jefferson IP Law, LLP

(57) ABSTRACT

Provided are a method and apparatus for supporting migration of mobile edge computing in a wireless communication system. A method, performed by a Session Management Function (SMF), of controlling a path between an Application function (AF) and a user equipment in a wireless communication system includes: receiving, from the AF, an AF request message including information indicating whether User Plane Function (UPF) modification is allowed; determining whether a modification of a UPF in the path between the AF and the user equipment is required; transmitting a notification including information associated with the modification of a UPF to the AF, based on a result of the determining whether the modification of the UPF is required; determining whether to wait for reception of a response message from the AF for a certain period of time, based on the information indicating whether UPF modification is allowed; and controlling a modification of the path between the AF and the user equipment, the path including the UPF, based on a result of the determining whether to wait.

15 Claims, 23 Drawing Sheets

(56) References Cited

U.S. PATENT DOCUMENTS

| | | | |
|---|---|---|---|
| 10,484,911 B1* | 11/2019 | Bogineni | H04W 28/16 |
| 11,006,326 B2 | 5/2021 | Zhou et al. | |
| 11,096,046 B2 | 8/2021 | Li et al. | |
| 11,206,700 B2 | 12/2021 | Dou et al. | |
| 11,419,035 B2 | 8/2022 | Dannebro et al. | |
| 2015/0024751 A1 | 1/2015 | Wong et al. | |
| 2017/0288972 A1* | 10/2017 | Li | H04W 36/22 |
| 2017/0317894 A1* | 11/2017 | Dao | H04L 41/5009 |
| 2017/0366399 A1 | 12/2017 | Li et al. | |
| 2018/0192471 A1 | 7/2018 | Li et al. | |
| 2018/0270715 A1* | 9/2018 | Lee | H04W 36/0011 |
| 2018/0270778 A1 | 9/2018 | Bharatia | |

FOREIGN PATENT DOCUMENTS

| | | |
|---|---|---|
| CN | 108271229 A | 7/2018 |
| CN | 108370600 A | 8/2018 |
| JP | 2019-536305 A | 12/2019 |
| JP | 2021-504991 A | 2/2021 |
| KR | 10-2013-0076870 A | 7/2013 |
| KR | 10-2018-0106998 A | 10/2018 |
| KR | 10-2018-0107000 A | 10/2018 |

OTHER PUBLICATIONS

ETSI TS 23.501: 5G; System Architecture for the 5G System, Jun. 19, 2018.
ETSI TS 23.502: 5G; Procedures for the 5G System, Jun. 19, 2018.
Extended European Search Report dated Oct. 29, 2021, issued in European Patent Application No. 19869392.1.
International Search Report dated Jan. 7, 2020, issued in International Patent Application No. PCT/KR2019/012458.
Huawei et al., TS 23.501: AF response in AF influence on traffic routing, 3GPP TSG SA WG2 #123, S2-177386, Oct. 2017.
Huawei et al., Solution for KI#3: AF Response to UP Path Management Event Notifications, 3GPP TSG SA WG2 #128BIS, S2-188445, Aug. 2018.
Samsung, A new parameter on AF influence traffic routing request for edge computing support, 3GPP TSG SA WG2 #129, S2-1810807, Oct. 2018.
Notice Of Allowance dated Jul. 18, 2023, issued in Japanese Application No. 2021-518577.
Huawei et al., TS 23.501: Align PDU session establishment with AF influence on traffic routing and update to DN authorization of PDU session establishment., 3GPP TSG SA WG2 Meeting #122, S2-174435, Jun. 26-Jun. 30, 2017 San Jose Del Cabo, Mexico.
Huawei et al., TS 23.501: AF influenced PDU session establishment and DN authentication/authorization via NEF, BGPP TSG SA WG2 Meeting #123, S2-177383, Oct. 23-Oct. 27, 2017, Ljubljana, Slovenia.
Chinese Office Action dated Sep. 20, 2023, issued in Chinese Application No. 201980065929.3.

* cited by examiner

METHOD AND APPARATUS FOR SUPPORTING TRANSFER OF MOBILE EDGE COMPUTING IN WIRELESS COMMUNICATION SYSTEM

TECHNICAL FIELD

The present disclosure relates to a method for supporting mobile edge computing in a wireless communication system. In detail, the present disclosure relates to an apparatus and method for supporting migration (or, transfer) of resources of mobile edge computing in a 5G mobile communication network without interruption of service.

BACKGROUND

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' 5G communication systems defined in the 3GPP standard are referred to as New Radio (NR) systems.

In order to achieve a high data rate, 5G communication systems are being developed for implementation at a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (massive MIMO), full dimensional MIMO (FD-MIMO), array antennas, analog beamforming, and large-scale antennas. These technologies have been applied to NR systems.

In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation.

In addition, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine-to-machine (M2M) communication, machine-type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, 5G communication technologies related to sensor networks, M2M communication, MTC, etc., are being implemented using schemes such as beam-forming, MIMO, array antennas, etc. The application of Cloud-RAN as a big data processing technology described above may be an example of convergence of 5G communication technology and IoT technology.

In addition, techniques related to mobile edge computing or fog computing developed from previous cloud computing have emerged, and the core of these techniques is installing distributed cloud computing nodes at locations near a user whereas, in the related art, services are provided from a centralized data center. Cloud computing nodes installed near a user are able to immediately process a request from a user equipment and return the same, thus enabling lower latency and larger-capacity transmission as compared to existing centralized cloud computing environments. Examples of services using such mobile edge computing include connected cars, virtual reality, augmented reality, or big data analysis.

Furthermore, Vehicle to Everything (V2X) is a general term referring to all types of communication methods applicable to road vehicles, and in conjunction with the progress in wireless communication technology, various additional services other than safety use cases of the initial operation are becoming possible. As V2X-service providing techniques, Wireless Access in Vehicular Environments (WAVE) based on IEEE 802.11p and IEEE P1609 are standardized. However, WAVE, which is a type of Dedicated Short Range Communication (DSRC), has a limitation in which the range of reach of messages between vehicles is limited. To overcome this limitation, cellular-based V2X technology standards are in progress in 3GPP. In Release 14, LTE-based 4G V2X standards have been completed, and in Release 16, NR-based 5G V2X standards are in progress.

As described above, as various services may be provided in accordance with the development of a wireless communication system, there is a need for methods of effectively providing such services.

DESCRIPTION OF EMBODIMENTS

Solution to Problem

The disclosed embodiments provide an apparatus and method of effectively providing services in a wireless communication system. In detail, an apparatus and method for supporting migration of mobile edge computing in a wireless communication system are provided.

BEST MODE

Figure 1:
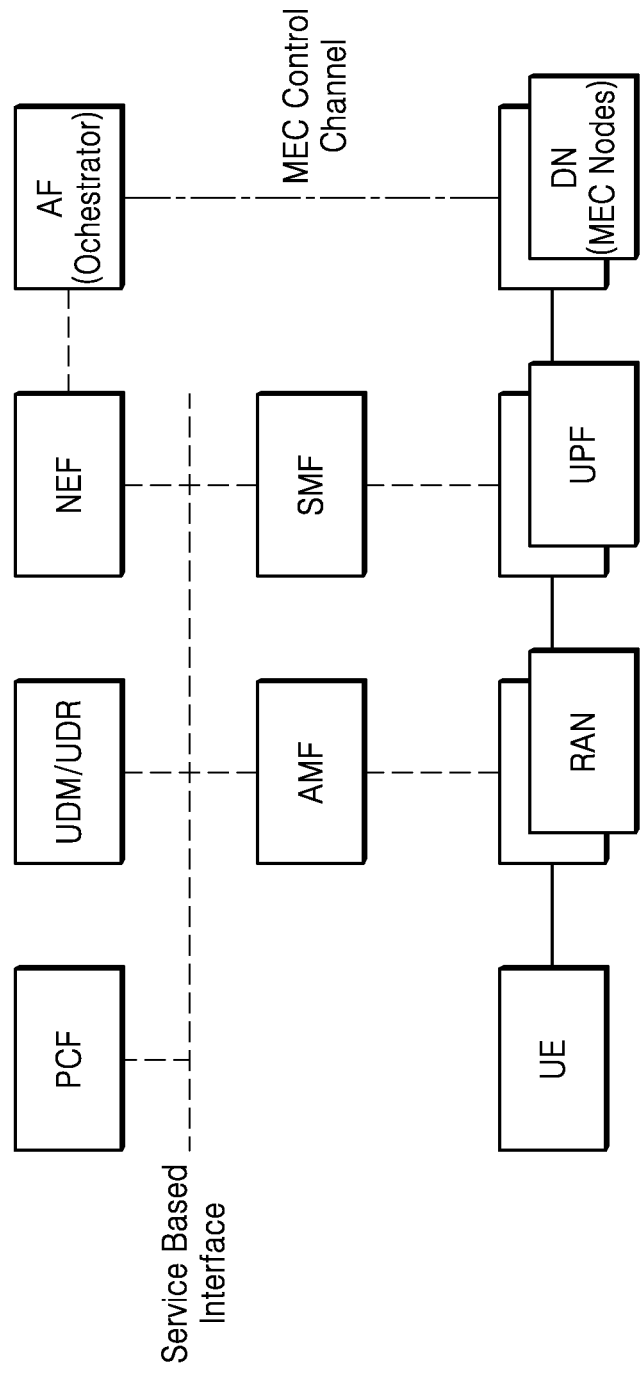
FIG. 1 is a diagram illustrating a network structure and an interface of a wireless communication system according to an embodiment.

A method of supporting migration of mobile edge computing in a wireless communication system may include transmitting, by a Session Management Function (SMF), advance notification information about a modification of a User Plane Function (UPF) to an Application Function (AF), controlling, by the SMF, an operation related to the UPF according to a request from the AF, transmitting, by the SMF, post-event notification information about a modification of the UPF to the AF, and updating, by the AF, control information about the UPF.

A method, performed by a Session Management Function (SMF), of controlling a path between an Application Function (AF) and a user equipment in a wireless communication system according to an embodiment of the disclosure includes: receiving, from the AF, an AF request message including information indicating whether User Plane Function (UPF) modification is allowed; determining whether a modification of a UPF in the path between the AF and the user equipment is required; transmitting a notification including information associated with the modification of the UPF to the AF based on a result of the determining whether the modification of the UPF is required; determining whether to wait for reception of a response message from the AF for a certain period of time, based on the information indicating whether UPF modification is allowed; and controlling a modification of the path between the AF and the user equipment, the path including the UPF, based on a result of the determining whether to wait.

According to an embodiment of the disclosure, the method may further include identifying a response of the AF as NACK, based on the information indicating whether UPF modification is allowed, in case that the response message is not received from the AF for the certain period of time.

According to an embodiment of the disclosure, the method may further include receiving the response message corresponding to the notification from the AF, wherein the receiving of the response message includes receiving an ACK message from the AF in case that mobile edge computing (MEC) migration is completed within the certain period of time, and receiving a NACK message from the AF in case that the MEC migration is not completed within the certain period of time.

According to an embodiment of the disclosure, the certain period of time may be a maximum waiting time to wait for reception of the response message from the AF, and the notification may include information indicating the certain period of time.

According to an embodiment of the disclosure, wherein the response message from the AF may be directly transmitted from the AF to the SMF or transmitted to the SMF via a Network Exposure Function (NEF), and transmitted not via a Policy Control Function (PCF).

According to an embodiment of the disclosure, the notification may include at least one of an early notification or a late notification, and the early notification may be transmitted to the AF before a new path is configured between the AF and the user equipment, and the late notification may be transmitted to the AF after a new path is configured between the AF and the user equipment.

According to an embodiment of the disclosure, the notification may include the early notification, and the controlling of the modification of the path between the AF and the user equipment may include not modifying the UPF during the certain period of time based on the information indicating whether UPF modification is allowed.

According to an embodiment of the disclosure, the notification may include a late notification, and the controlling of the modification of the path between the AF and the user equipment may include not activating a protocol data unit (PDU) session via a modified UPF during the certain period of time based on the information indicating whether UPF modification is allowed.

A Session Management Function (SMF) for controlling a path between an Application function (AF) and a user equipment in a wireless communication system, according to an embodiment of the disclosure, includes: a transceiver; a memory; and at least one processor configured to: control the transceiver to receive, from the AF, an AF request message including information indicating whether User Plane Function (UPF) modification is allowed, determine whether a modification of a UPF in the path between the AF and the user equipment is required, control the transceiver to transmit a notification including information associated with the modification of the UPF to the AF, based on a result of the determining whether the modification of the UPF is required, determine whether to wait for reception of a response message from the AF for a certain period of time, based on the information indicating whether UPF modification is allowed, and control a modification of the path between the AF and the user equipment, the path including the UPF, based on a result of the determining whether to wait.

MODE OF DISCLOSURE

Hereinafter, embodiments of the disclosure will be described in detail with reference to accompanying drawings.

Description of details that are well known to one of ordinary skill in the art and not directly related to the disclosure will be omitted. The purpose of this is to omit unnecessary description not to obscure but to clearly convey the gist of the disclosure.

For the same reason, some of elements may be exaggerated or omitted or schematically illustrated in the attached drawings. Also, sizes of elements do not completely reflect the actual size. In the drawings, like or corresponding elements are labeled with like reference numerals.

The advantages and features of the disclosure and methods of achieving the advantages and features will become apparent with reference to embodiments described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" used in the embodiments of the disclosure may denote an element composed of hardware, such as a field programmable gate array (FPGA) or an application-specific integrated circuit (ASIC), or software and may perform a particular task. However, the term 'unit' or '~er(or)' is not limited to software or hardware. The term 'unit' or '~er(or)' may be configured to be included in an addressable storage medium or to reproduce one or more processors. Thus, the term 'unit' or ' ~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers(ors)' may be implemented to operate one or more central processing units (CPUs) in a device or a secure multimedia card. Also, 'units' or '~ers(ors)' in the embodiments may include at least one processor.

In the detailed description of the embodiments of the disclosure, a New RAN (NR), which is a wireless access network, and a packet core, which is a core network (5G system or 5G Core Network or NG Core; Next Generation Core) in the 5G mobile communication standard specified by the 3rd Generation Partnership Project (3GPP) are mainly described, but the gist of the disclosure may also apply to communication systems having a similar technical background with slight modifications within the scope of the disclosure, and this will be possible by the judgment of a person skilled in the art to which the disclosure belongs.

Herein, for convenience of description, some of the terms and names defined in the 3GPP Long Term Evolution (LTE) standards (5G, NR, LTE, or other similar system standards) may be used. However, the disclosure is not limited by such terms and names, but may also be applied to systems complying with other specifications.

Also, in the following description, the term for identifying an access node, the term referring to a network entity, the term referring to messages, the term referring to an interface between network entities, and the term referring to various identification information, and the like are examples provided for convenience of description. However, the disclosure is not limited by the following terms, and other terms having equivalent technical meanings may be used.

While describing the disclosure, detailed description of related well-known functions or configurations may be omitted when it is deemed that they may unnecessarily obscure the essence of the disclosure. Hereinafter, an embodiment of the disclosure will be described with reference to accompanying drawings.

An embodiment of the disclosure relates to a situation in which a user equipment is provided with a service from Mobile Edge Computing (MEC) when a 5G or New Radio (NR) mobile communication network system is connected to MEC. When a user equipment is provided with a service via MEC, data transmission or reception between the user equipment and the MEC may be performed via a 5G mobile communication network and some other external transmission networks. The user equipment transmits or receives data to or from a radio access network (RAN) via wireless communication, and the RAN may have a path through which data is transmitted or received to or from a data network (DN), which is located outside, via a user plane function (UPF) which is a component of a 5G Core Network (5GC). As components of the 5GC that manage the connection, an Access and Mobility Function (AMF), a UPF, a Policy Control Function (PCF), a Session Management Function (SMF), a User Data Repository/User Data Management (UDR/UDM), a Network Exposure Function (NEF), or the like, may be included. These components may be involved to control a communication procedure for controlling.

In a mobile communication system, a modification of some components of a base station (hereinafter, "RAN") of a 5GC or of a protocol data unit (PDU) session connected according to movement of a user equipment, may occur according to a handover procedure defined in the 3GPP.

FIG. 1 is a diagram illustrating a network structure and an interface of a wireless communication system according to an embodiment.

In detail, FIG. 1 illustrates a relationship between a user equipment to be provided with a service via MEC, a 5G mobile communication system, an MEC node, and an Application Function (AF, MEC Orchestrator) for controlling. Referring to FIG. 1, a network structure and interfaces connected to a user equipment (hereinafter, "UE") may include a RAN, a UPF, a DN, an AMF, an SMF, a PCF, a UDM/UDR, an NEF, and an AF.

Figure 2:
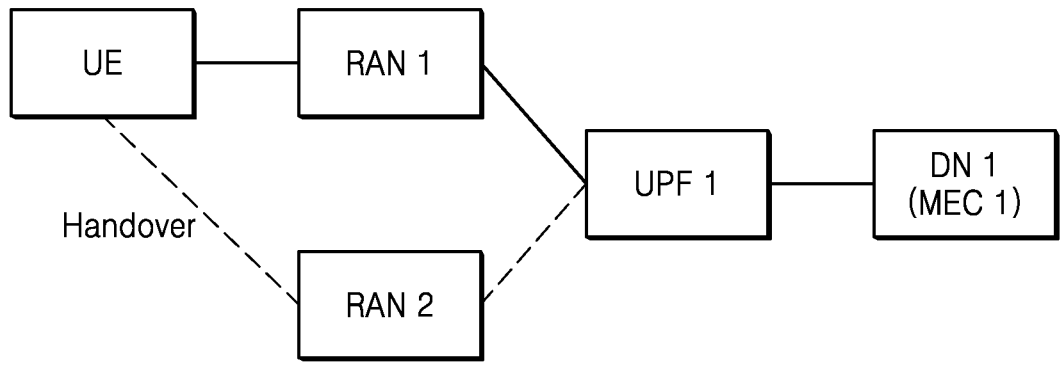
FIG. 2 is a diagram for describing a handover situation without a modification of a protocol data unit (PDU) session, according to an embodiment.
Figure 3:
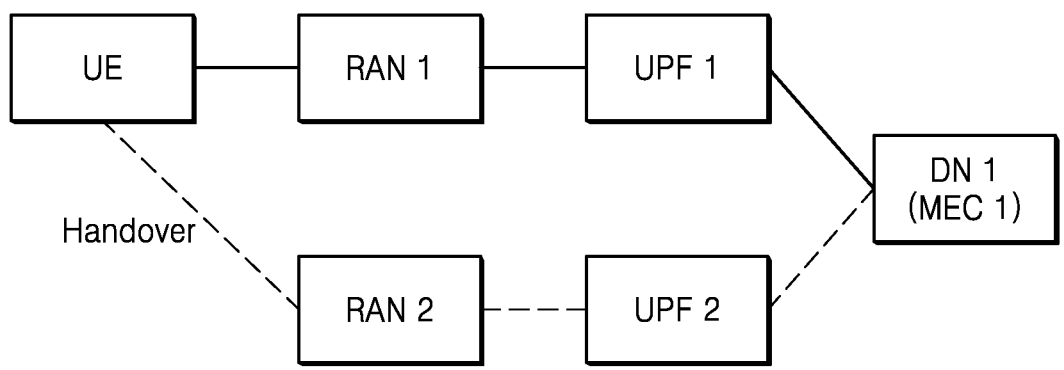
FIG. 3 is a diagram illustrating a handover situation in which a modification of a PDU session is accompanied but a same mobile edge computing (MEC) node is connected, according to an embodiment.
Figure 4:
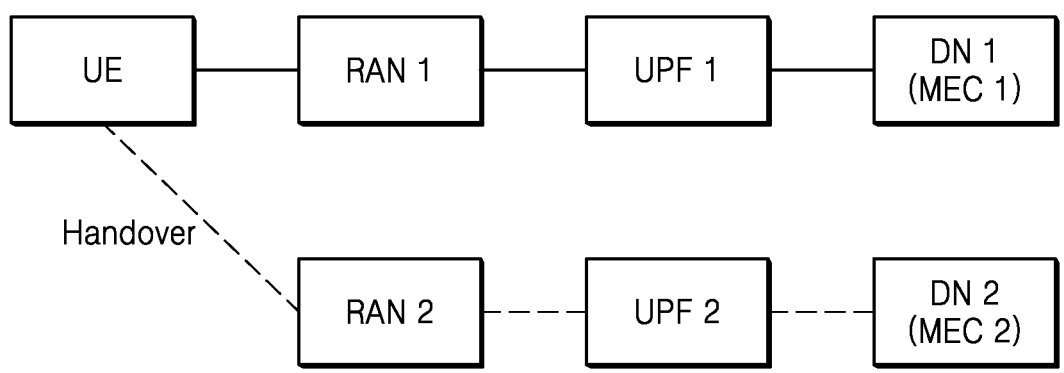
FIG. 4 is a diagram illustrating a handover situation in which a modification of a PDU session is accompanied and different MEC nodes are connected, according to an embodiment.

FIGS. 2 through 4 are diagrams for describing situations of a handover that may occur according to movement of a user equipment according to embodiments. The management and control of a PDU session for determining a modification of a UPF or transferring data may be performed through the SMF of the 5GC and procedures related to an AMF, a PCF, and a UDM/UDR which may be useful for operation of the SMF.

FIG. 2 illustrates a handover situation according to an embodiment. In detail, FIG. 2 illustrates a handover situation without a modification of a PDU session. Referring to FIG. 2, a scenario is illustrated, in which, when a handover takes place according to movement of a user equipment, a RAN in charge of a wireless network is modified from RAN 1 to RAN 2, but a UPF transmitting data in the 5GC is not modified.

FIG. 3 illustrates a handover situation according to an embodiment. In detail, FIG. 3 illustrates a scenario, in which a PDU session is modified but a same MEC node provides a service to a user equipment. Referring to FIG. 3, a scenario is illustrated, in which, when both a modification of a RAN and a modification of a UPF have occurred according to movement of a user equipment, previous UPF1 and UPF2 are able to communicate with a MEC 1 node that is providing a service.

FIG. 4 illustrates a handover situation according to an embodiment. Referring to FIG. 4, a scenario is illustrated, in which, as a user equipment moves, a modification of an MEC node providing a service is accompanied with a modification of a RAN and a UPF. Here, the user equipment may be provided with a service from an MEC2 node instead of an MEC 1 node, after a handover takes place. Here, RAN2 may be connected to UPF1 that was transmitting data previously.

In the disclosure, in the scenario of FIG. 2, there may be no modification of a PDU session that identifies a connection between a user equipment and a DN in the 5GC and a PDU session anchor. In this case, when a handover takes place, connection to the service may continue via an internal operation of the 5GC.

Meanwhile, in both the situations corresponding to the scenarios of FIGS. 3 and 4, migration to a new UPF is necessary (i.e., required), and an address of a user equipment shown on the outside, that is, an address of a PDU session anchor may be modified. In this situation, in an MEC node located outside, because a new connection to a service needs to be established as the address of the user equipment is modified, the service may be disconnected. Furthermore, in the scenario of FIG. 4, as MEC that provides a service changes, an additional procedure of moving traffic to be transmitted or received by a user equipment in the 5GC, from MEC1 to MEC2, may be required. Here, as a method to help support migration of MEC, protocols such as Layer 2 (L2) or Layer 3 (L3)-based tunneling protocols such as Virtual Extensible Local Area Network (VXLAN), Network Virtualization using Generic Routing Encapsulation (NVGRE), or Locator Identifier Separation Protocol (LISP), may be supported by the user equipment and the MEC node or proxy servers located therebetween.

In the 3GPP, to support MEC and other vertical services, an AF influence on traffic routing function of requesting to control specific network traffic, by an AF located outside the 5G system (5GS), is defined in TS 23.501 and TS 23.502.

Figure 5:
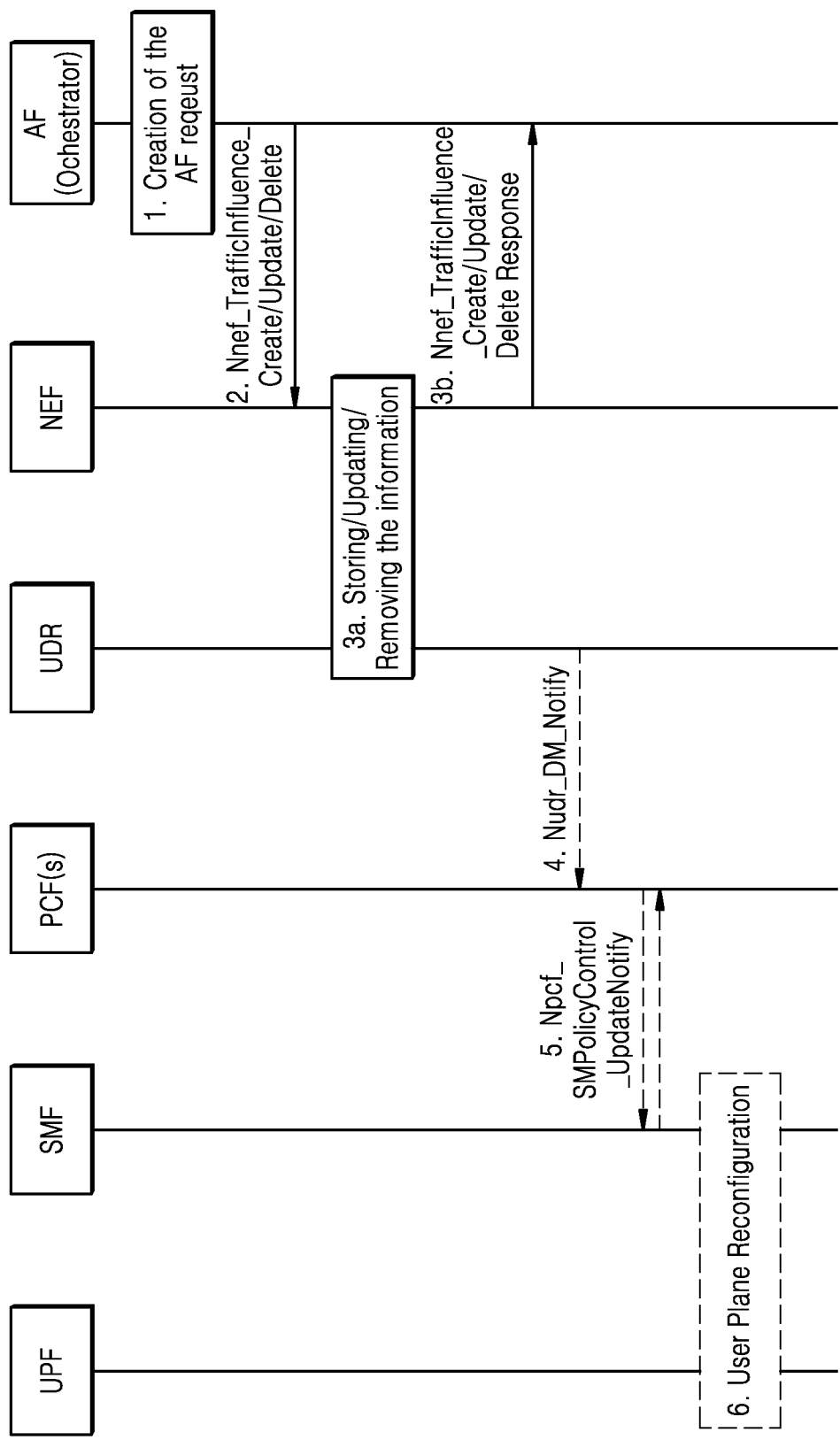
FIG. 5 is a diagram illustrating an Application Function (AF) Influence on traffic routing procedure defined in the 5GC, according to an embodiment.
Figure 6:
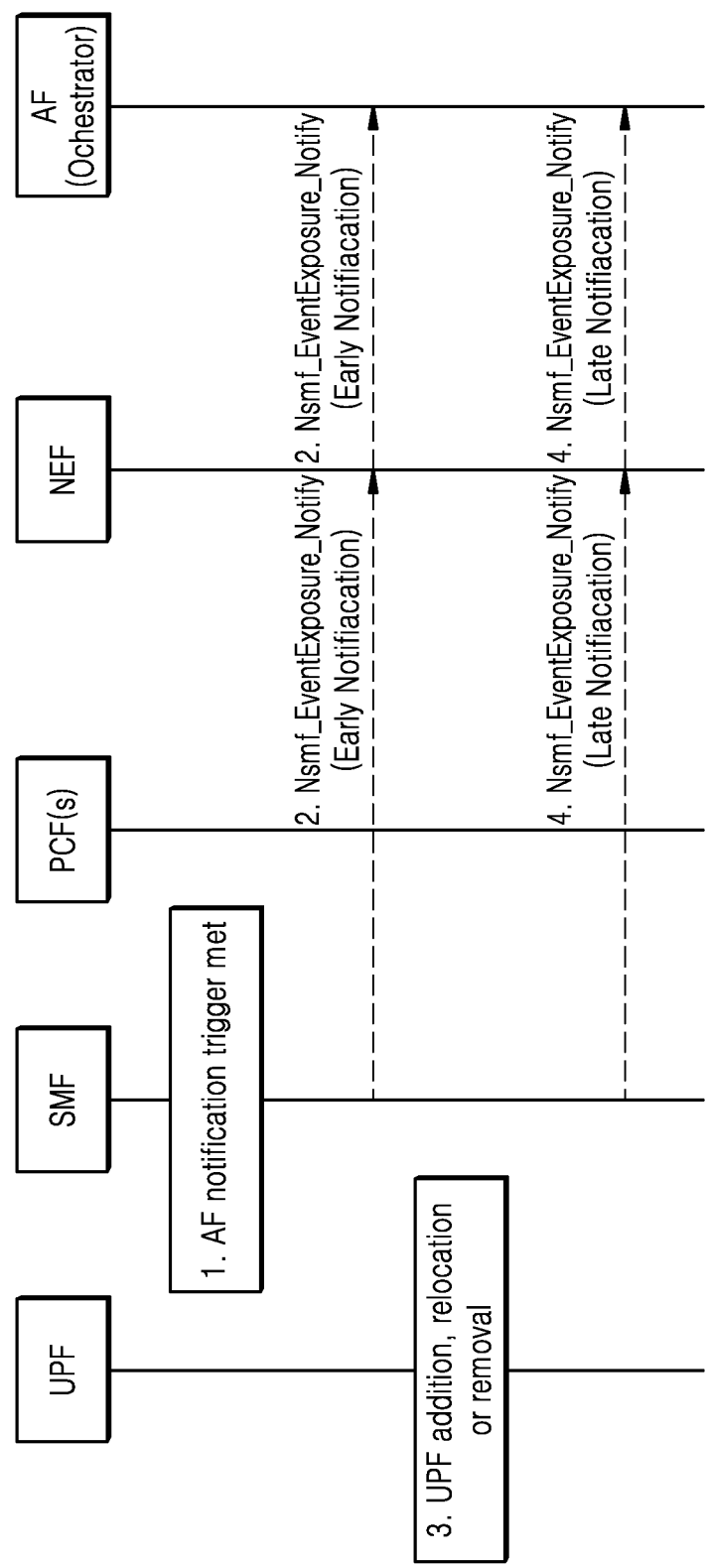
FIG. 6 is a diagram illustrating an AF notification procedure during AF Influence on traffic routing defined in the 5GC, according to an embodiment.

An embodiment regarding related procedures is described with reference to FIG. 5, and a factor transmitted by the AF via an NEF will be described with reference to Table 1. By using this function, the AF may request a traffic path so as to transmit traffic generated in a user equipment that uses services of the AF, to a particular DN (or, data network name (DNN)), and may transmit conditions related to time and place and additional information to the 5GC. In the embodiment, the AF may be further notified of an occurred event such as creation/deletion of a PDU session, subscription of events of which is requested, a modification of a DN Access Identifier (DNAI), a case where a SMF receives an AF notification and a PDU session has met certain conditions. Here, the notification may be classified into an early notification transmitted by the SMF before performing a particular operation and a late notification transmitted by the SMF after performing the particular operation. A procedure of transmitting the notification described above will be described with reference to FIG. 6.

As described above, Table 1 shows AF transmission factors used in the AF Influence on Traffic Routing procedure.

TABLE 1

| Information Name | Applicable for PCF or NEF | Applicable for NEF only | Category |
| --- | --- | --- | --- |
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s). | The potential locations of applications can be represented by AF-Service-Identifier. | Conditional (NOTE 1) |
| Target UE Identifrer(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | N6 traffic routing information corresponding to each DNAI. | N/A | Optional |
| Application Relocation Possibility | Indicates whether an application can be relocated once a location of the application is selected by the 5GC. | N/A | Optional |
| Temporal Validity Condition | Time interval(s) or duration(s). | N/A | Optional |
| Notification Type | Indicates whether the type of AF subscription to notification is for early notification and/or for late notification. | N/A | Optional |

(NOTE 1):

The potential locations of applications and traffic routing requirements may be absent only if the request is for subscription to notifications about UP path management events only.

Hereinafter, a detailed embodiment regarding a method of preventing disconnection of services that a user equipment is being provided, when an MEC node is migrated in each of the above-described situations, will be described.

First Embodiment

A first embodiment of the disclosure relates to a method for solving interruption of a service due to a modification of an address of a user equipment on a group MEC node according to a modification of a UPF in the scenario of FIG. 3. According to the scenario of FIG. 3, migration of a RAN communicating with the user equipment may be migrated according to movement of the user equipment, and a UPF may be migrated along with the migration of the RAN. Here, the conditions of migration of a UPF may include a case where a RAN is migrated to RAN 2 that is outside a service area of previous UPF 1, a case where connection between RAN 2 and UPF 1 is not allowed for other reasons, and a case migration of a UPF is performed according to internal management policy. The present embodiment is directed to, as an example, a case where the need for a modification of a UPF is recognized during a handover preparation process of a RAN (e.g., N2-based handover).

Figure 7:
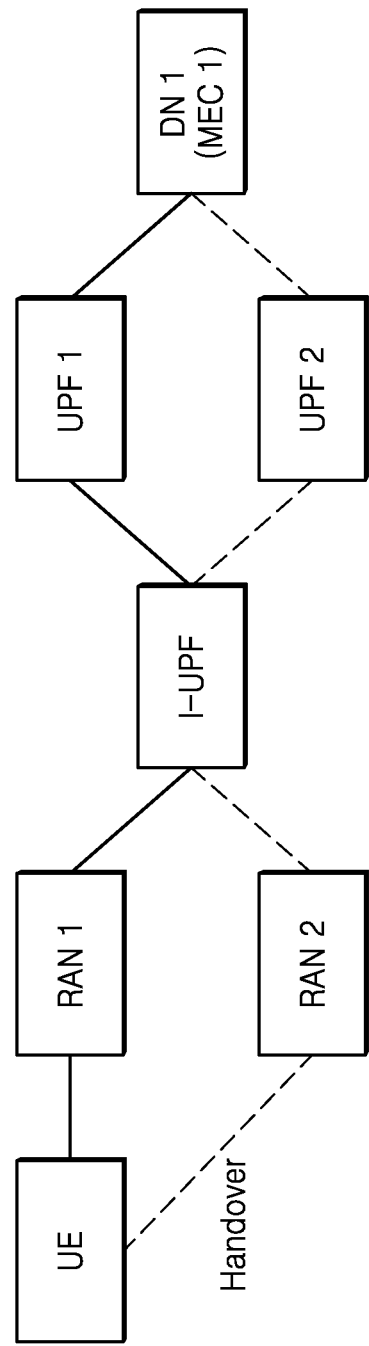
FIG. 7 is a diagram for describing a method of migration of a PDU session for connection to a same MEC via insertion of an intermediate UPF (I-UPF), according to an embodiment.

According to the present embodiment, a process of migrating a UPF by simultaneously maintaining, by a user equipment, a connection to UPF 1 and UPF 2 by using an I-UPF using an Uplink Classifier (UL CL) in a process of moving a PDU session from UPF 1 to UPF 2 via a RAN handover, may be suggested. In addition, MEC is an entity located outside the 5GC, and is not controllable by the 5GC, and reconfiguration of the MEC may occur due to a modification of a UPF and a modification of a UE address. Accordingly, data loss may occur when transmitting data via UPF 2 before reconfiguration is completed, and thus, to prevent this, a method of using a certain waiting time is suggested in the present embodiment. FIG. 7 illustrates a data transmission path of the 5GC for communication between a user equipment and MEC, to which the disclosure is applied.

In an embodiment, when transmitting an AF influence on traffic routing request, an AF may add a reconfiguration time in addition to the factors defined in Table 1. The reconfiguration time is a period of time taken to modify an MEC internal setting to continuously provide services in the MEC internally when a UPF is modified, and may be used by setting a value according to empirical knowledge or prediction. Moreover, the reconfiguration time may be calculated by including not only MEC but also a modification in a setting of an intermediate entity such as a gateway or a proxy that may be located on a path from a UPF to MEC, through which data is transmitted. That is, the reconfiguration time may refer to a period of time needed for reconfiguration of MEC according to a modification of a UPF and entities affected thereby. Table 2 illustrates an embodiment of AF influence on traffic routing factors including the reconfiguration time added to the factors of Table 1.

TABLE 2

| Information Name | Applicable for PCF or NEF | Applicable for NEF only | Category |
| --- | --- | --- | --- |
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s). | The potential locations of applications can be represented by AF-Service-Identifier. | Conditional (NOTE 1) |
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE, | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request, | N/A | Mandatory |
| Traffic Routing requirements | N6 traffic routing information corresponding to each DNAI. | N/A | Optional |
| Application Relocation Possibility | Indicates whether an application can be relocated once a location of the application is selected by the 5GC. | N/A | Optional |
| Temporal Validity Condition | Time interval(s) or duration(s). | N/A | Optional |
| Notification Type | Indicates whether the type of AF subscription to notification is for early notification and/or for late notification. | N/A | Optional |

TABLE 2-continued

| Information Name | Applicable for PCF or NEF | Applicable for NEF only | Category |
| --- | --- | --- | --- |
| Reconfiguration Time | Required time for reconfiguration when UPF relloacation happened | N/A | Optional |

(NOTE 1):
The potential locations of applications and traffic routing requirements may be absent only if the request is for subscription to notifications about UP path management events only.

Figure 8:
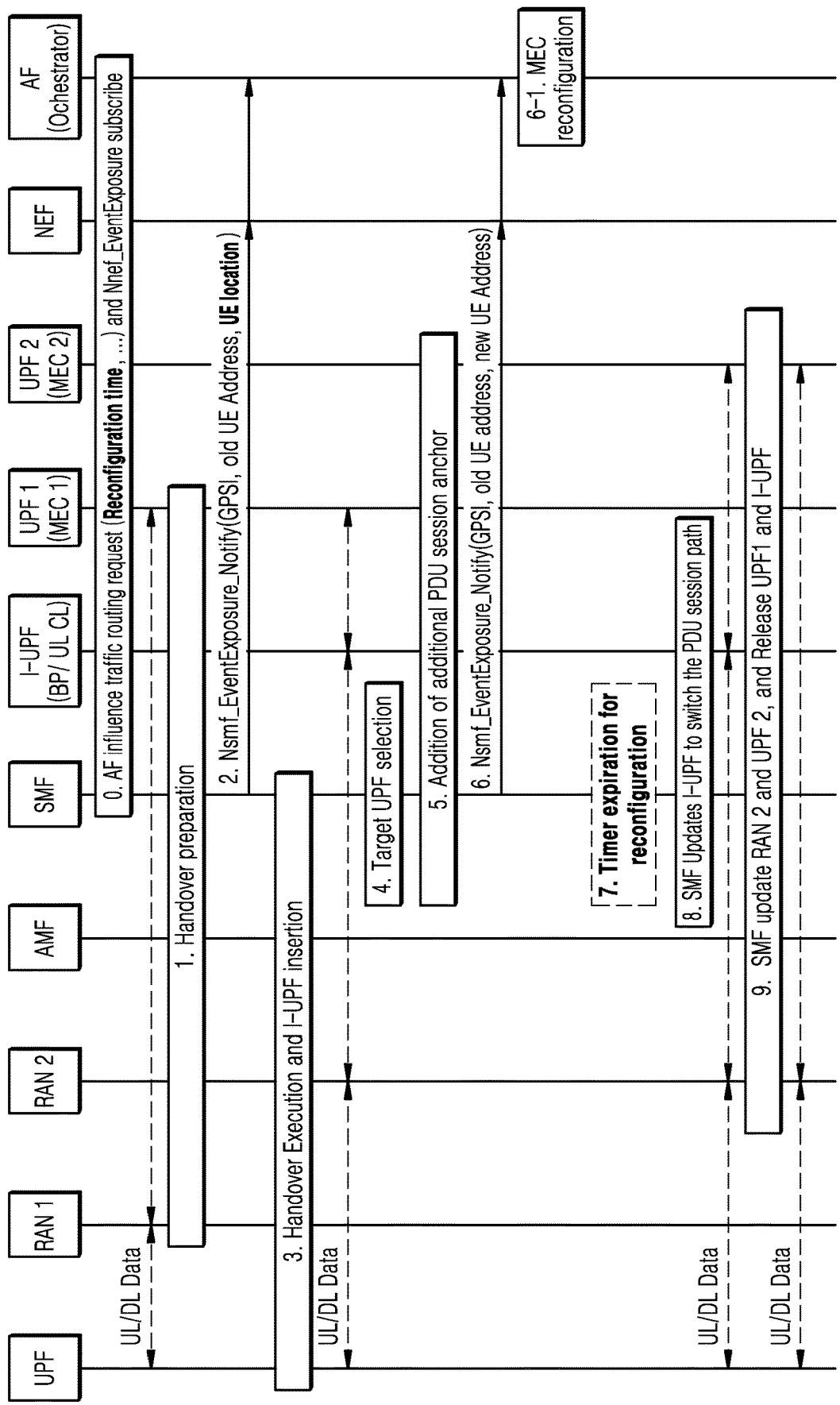
FIG. 8 is a diagram illustrating a PDU session migration procedure for connection to a same MEC via insertion of a network-based I-UPF, according to an embodiment.

FIG. 8 illustrates a migration procedure of a UPF according to the present embodiment.

In operation 0, an AF may transmit an AF influence on traffic routing request to an SMF via an NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, RAN 1 and 2 may detect a handover taking place from RAN 1 to RAN 2 according to movement of a user equipment. Accordingly, a handover preparation procedure may be performed.

In operation 2, when a modification of a UPF is recognizable in the 5GC (for example, an N2-based handover), the SMF may transmit an early notification related to the modification of the UPF to the AF. Here, the SMF may transmit a Generic Public Subscription Identifier (GPSI) of a related UE and an address of a current UE. Also, the SMF may further transmit a location of the current UE. The GPSI may be transmitted to be used to identify an UE, and the GPSI, an external ID, or mobile subscriber integrated services digital network (ISDN) number (MSISDN) may be transmitted. The location of the UE may be an additional factor that is selectively transmitted to the AF to optimize a path between DNAI and DN. Based on this, a path between the user equipment and MEC may be optimized in an MEC node or an intermediate transmission network.

In operation 3, a handover procedure between RANs may be completed. Here, a RAN connected to the user equipment may be migrated from RAN1 to RAN2. Moreover, insertion of an I-UPF may take place. Here, the I-UPF may have to be simultaneously connectable to RAN 1 and RAN 2. Creation of the I-UPF and connection thereof to RAN 1 are possible also in operation 1, but connection thereof to RAN 2 may be performed in operation 3. Next, communication between the user equipment and MEC may be performed via RAN 2, the I-UPF, and UPF 1.

In operation 4, the SMF may determine insertion of UPF2 to optimize a data transmission path and select a destination UPF.

In operation 5, the SMF may generate a connection to UPF 2 and set the UPF2 such that data is transmitted to the I-UPF.

In operation 6, after the connection to UPF 2 is completed, the SMF may transmit, to the AF, GPSI, an address of the UE at UPF2 to identify the user equipment. Here, an address of UPF 1 may also be transmitted to the AF.

In operation 6-1, the AF that has received a notification from the SMF may notify the MEC node that the address of the UE may be modified. Also, the AF may allow to reconfigure a previous connection by using a new address, that is, a user equipment address allocated in UPF2, with respect to a connection to a UE corresponding to the GPSI.

Loss may occur in data generated in the user equipment while operation 6-1 is performed when the data is transmitted via UPF 2. Accordingly, to prevent this, in operation 7, the data generated in the user equipment may be set to be transmitted via the previous UPF1. The SMF may wait for a period of time needed for reconfiguration, the period of time received from the AF in operation 0.

In operation 8, a QoS flow corresponding to a UE receiving a service in UPF1 may be migrated to UPF 2. Moreover, the SMF may update the I-UPF to allow the data generated in the user equipment to be transmitted to MEC via UPF 2.

In operation 9, the SMF may release the connection between the I-UPF and UPF 1 and reconfigure UPF 2 and RAN 2 to allow direct data transmission.

Second Embodiment

Figure 9:
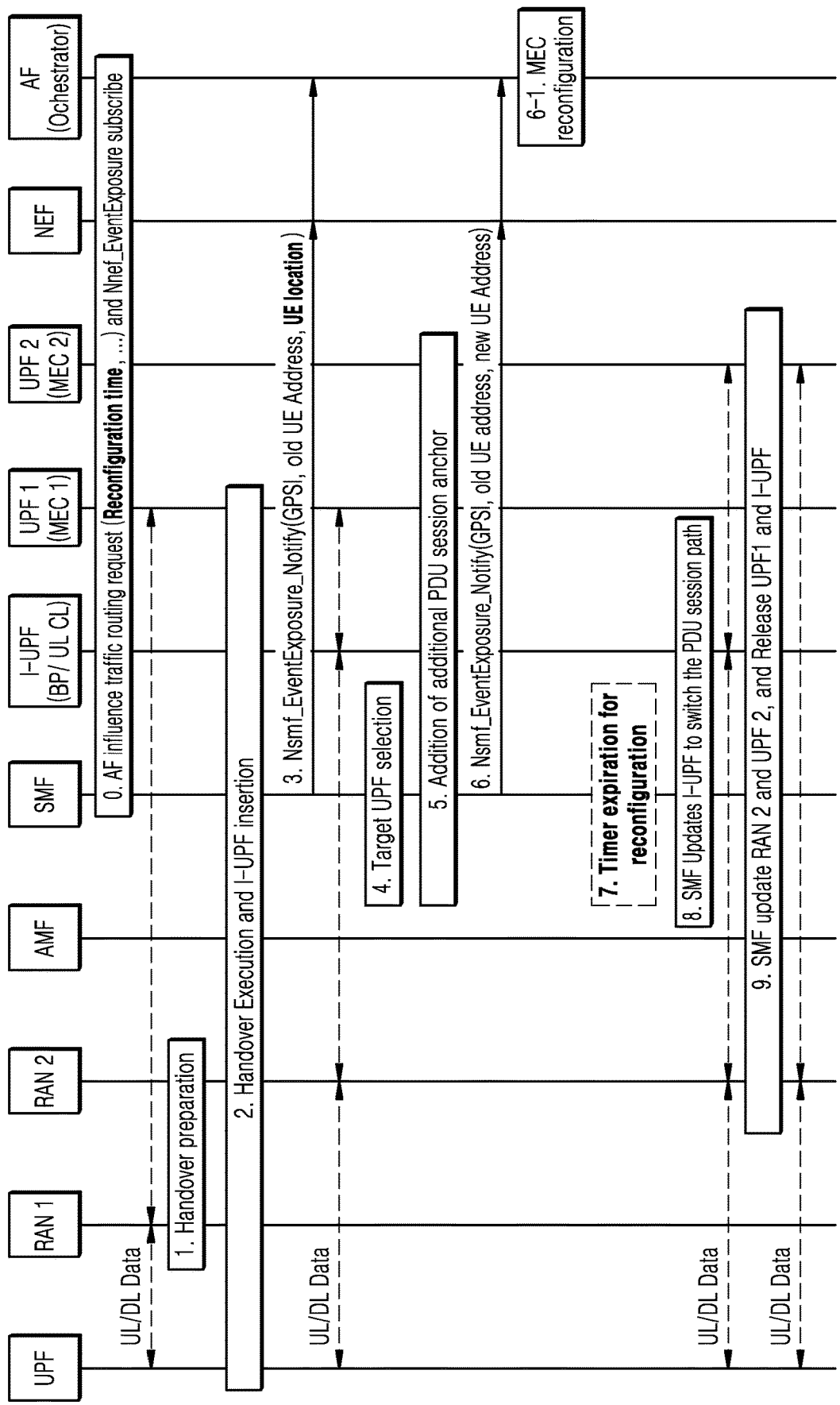
FIG. 9 is a diagram illustrating a PDU session migration procedure for connection to a same MEC via insertion of a radio access network (RAN)-based I-UPF, according to an embodiment.

FIG. 9 is a diagram for describing a procedure to cope with a case where whether a UPF is modified or not is not known in a handover preparation process of a RAN (e.g., an Xn-based handover) in the first embodiment described above.

In operation 1, RAN 1 and 2 may detect a handover occurring from RAN 1 to RAN 2 according to movement of a user equipment, and a handover preparation procedure may be performed.

In operation 2, when a handover procedure between the RANs is completed, a RAN connected to the user equipment may be migrated from RAN1 to RAN2. Moreover, insertion of an I-UPF may take place. Here, the I-UPF may have to be simultaneously connectable to RAN 1 and RAN 2. Creation of the I-UPF and connection thereof to RAN 1 are possible also in operation 1, but connection thereof to RAN 2 may be performed in the present operation. Next, communication between the user equipment and MEC may be performed via RAN 2, the I-UPF, and UPF 1.

In operation 3, the SMF may transmit an early notification related to a modification of a UPF to the AF. Here, the SMF may transmit a GPSI of a related UE and an address of a current UE. Also, the SMF may further transmit a location of the current UE. The GPSI may be used to identify an UE by the AF, and the GPSI or an external ID or MSISDN may be transmitted. The location of the UE is a factor that is selectively transmitted to the AF to optimize a path between DNAI and DN. Based on this, in an MEC node or an intermediate transmission network, a path between the user equipment and MEC may be optimized.

In operation 4, the SMF may determine insertion of UPF2 to optimize a data transmission path and select a destination UPF.

In operation 5, the SMF may generate a connection to UPF2 and set UPF2 such that data is transmitted to the I-UPF.

In operation 6, after the connection to UPF 2 is completed, the SMF may transmit, to the AF, GPSI, an address of the UE at UPF2 to identify the user equipment. Here, an address of UPF 1 may also be transmitted to the AF.

In operation 6-1, the AF that has received a notification from the SMF may notify the MEC node that the address of the UE may be modified. Also, the AF may allow to reconfigure a previous connection by using a new address, that is, a user equipment address allocated in UPF2, with respect to a connection to a UE corresponding to the GPSI.

Loss may occur in data generated in the user equipment while operation 6-1 is performed when the data is transmitted via UPF 2. Accordingly, to prevent this, in operation 7, the data generated in the user equipment may be set to be transmitted via the previous UPF1. The SMF may wait for a period of time needed for reconfiguration, the period of time received from the AF in operation 0.

In operation 8, a QoS flow corresponding to a UE receiving a service in UPF1 may be migrated to UPF 2. Moreover, the SMF may update the I-UPF to allow the data generated in the user equipment to be transmitted to MEC via UPF 2.

In operation 9, the SMF may disconnect the I-UPF and UPF 1 from each other and reconfigure UPF 2 and RAN 2 to allow direct data transmission.

Third Embodiment

Figure 10:
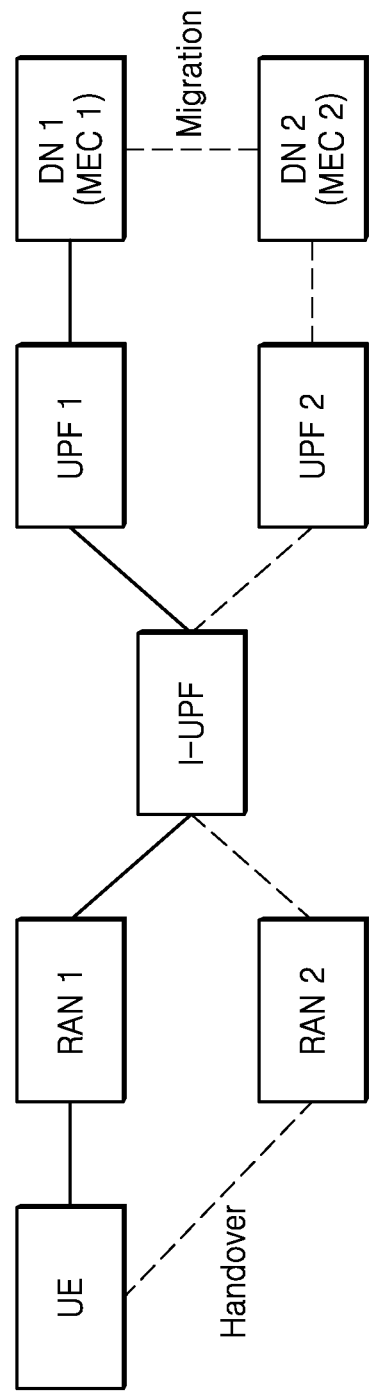
FIG. 10 is a diagram illustrating a method of migration of a PDU session for connection to a different MEC via insertion of an I-UPF, according to an embodiment.

FIG. 10 is a diagram for describing a method and procedure for supporting migration corresponding to FIG. 4. In an embodiment, the present procedure may be a scenario in which a modification of a RAN, a modification of a UPF, and a modification of MEC occur at the same time, and the scenario may take place when a destination is moved from MEC1 to MEC2 according to movement of a user equipment in the first embodiment described above.

Here, during a period of time needed for migration of MEC, communication with MEC 2 via UPF 2 may not be activated. When UPF 2 is ready and data of the user equipment is transmitted, because MEC 2 is not ready, data loss may occur. Accordingly, there is a need for the MEC to notify the SMF of such a migration time, and the notification may be performed by updating previous AF influence on traffic routing request or resending AF influence on traffic routing by limiting a particular user equipment as a migrating user equipment. Here, the AF may add a period of time taken for migration to the request and transmit the same. Table 3 shows factors that may be used in a request.

TABLE 3

| Information Name | Applicable for PCF or NEF | Applicable for NEF only | Category |
|---|---|---|---|
| Traffic Description | Defines the target traffic to be influenced, represented by the combination of DNN and optionally S-NSSAI, and application identifier or traffic filtering information, | The target traffic can be represented by AF-Service-Identifier, instead of combination of DNN and optionally S-NSSAI, | Mandatory |
| Potential Locations of Applications | Indicates potential locations of applications, represented by a list of DNAI(s). | The potential locations of applications can be represented by AF-Service-Identifier. | Conditional (NOTE 1) |
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | N6 traffic routing information corresponding to each DNAI. | N/A | Optional |
| Application Relocation Possibility | Indicates whether an application can be relocated once a location of the application is selected by the 5GC. | N/A | Optional |
| Temporal Validity Condition | Time interval(s) or duration(s). | N/A | Optional |
| Notification Type | Indicates whether the type of AF subscription to notification is for early notification and/or for late notification. | N/A | Optional |
| Reconfiguration Time | Required time for reconfiguration when UPF relloacation happened | N/A | Optional |
| Migration Time | A required time for migratinig MEC from the old location to the new location | N/A | Optional |

(NOTE 1):
The potential locations of applications and traffic routing requirements may be absent only if the request is for subscription to notifications about UP path management events only.

Figure 11:
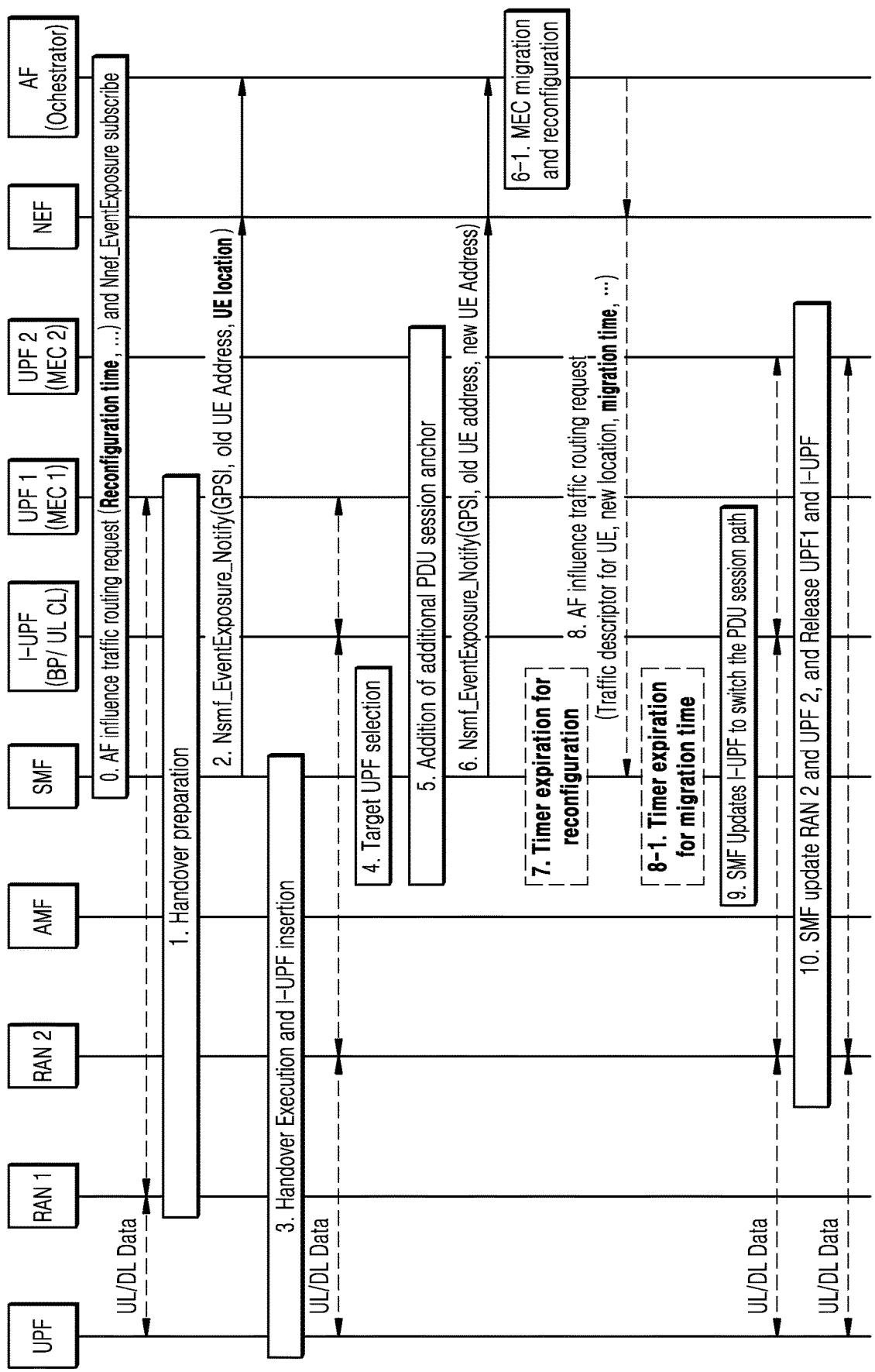
FIG. 11 is a diagram illustrating a PDU session migration procedure for connection to a different MEC via insertion of a network-based I-UPF, according to an embodiment.

FIG. 11 illustrates a migration procedure of a UPF according to the present embodiment.

In operation 0, the AF may transmit an AF influence on traffic routing request to the SMF via the NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, RAN 1 and 2 may detect a handover occurring from RAN 1 to RAN 2 by movement of the user equipment, and a handover preparation procedure may be performed accordingly.

In operation 2, when a modification of a UPF is recognizable in the 5GC (for example, an N2-based handover), the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. Based on this, in an MEC node or an intermediate transmission network, a path between the user equipment and MEC may be optimized.

In operation 3, a handover procedure between the RANs may be completed. Here, a RAN connected to the user equipment may be migrated from RAN1 to RAN2. Moreover, insertion of an I-UPF may take place. Here, the I-UPF may have to be simultaneously connectable to RAN 1 and RAN 2. Creation of the I-UPF and connection thereof to RAN 1 are possible also in operation 1, but connection thereof to RAN 2 may be performed in operation 3. Next, communication between the user equipment and MEC may be performed via RAN 2, the I-UPF, and UPF 1.

In operation 4, the SMF may determine insertion of UPF2 to optimize a data transmission path and select a destination UPF.

In operation 5, the SMF may generate a connection to UPF2 and set UPF2 such that data is transmitted to the I-UPF.

In operation 6, after the connection to UPF 2 is completed, the SMF may transmit, to the AF, GPSI, an address of the UE at UPF2 to identify the user equipment. Here, an address of UPF 1 may also be transmitted to the AF.

In operation 6-1, the AF that has received a notification from the SMF may notify the MEC node that the address of the UE may be modified. Also, the AF may allow to reconfigure a previous connection by using a new address, that is, a user equipment address allocated in UPF2, with respect to a connection to a UE corresponding to the GPSI.

Loss may occur in data generated in the user equipment while operation 6-1 is performed when the data is transmitted via UPF 2. Accordingly, to prevent this, in operation 7, the data generated in the user equipment may be set to be transmitted via the previous UPF1. The SMF may wait for a period of time needed for reconfiguration, the period of time received from the AF in operation 0.

In operation 8, the AF may start migration of data needed for providing a service to a UE from MEC 1 to MEC 2 (e.g., a virtual machine image, a service-related context), and calculate a period of time needed for the needed migration. Next, the AF may transmit a new AF influence on traffic routing request or update a previous request (see Table 3). Here, the AF may also transmit a period of time needed for the migration. Operation 8 may be selectively provided.

In operation 8-1, when a migration time is obtained via operation 8, the SMF may wait for the migration time.

In operation 9, a QoS flow corresponding to the UE receiving a service in UPF1 may be migrated to UPF 2. Moreover, the SMF may update the I-UPF to allow the data generated in the user equipment to be transmitted to the MEC via UPF 2.

In operation 10, the SMF may release the connection between the I-UPF and UPF 1 and reconfigure UPF 2 and RAN 2 to allow direct data transmission.

Fourth Embodiment

Figure 12:
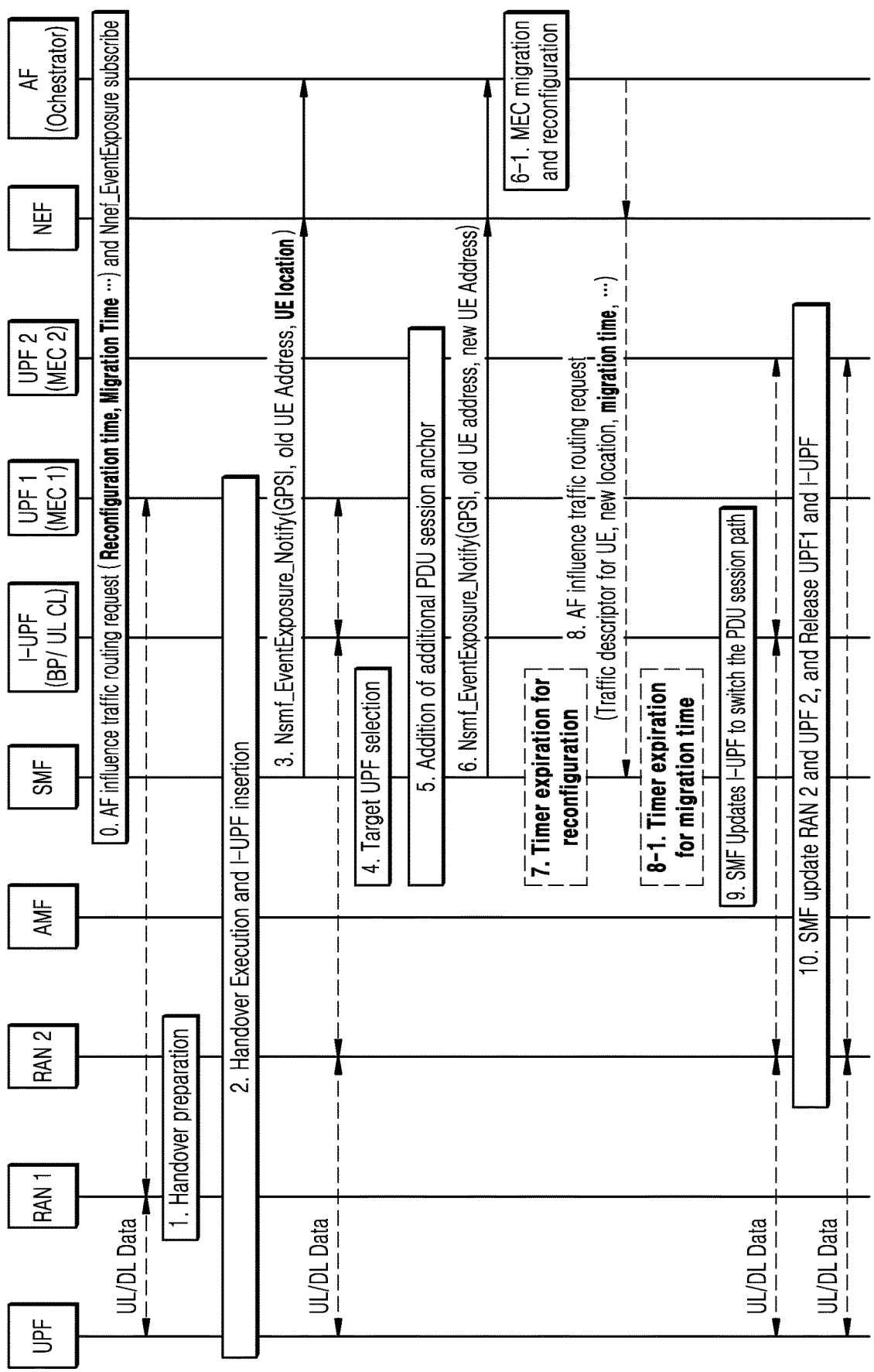
FIG. 12 is a diagram illustrating a PDU session migration procedure for connection to a different MEC via insertion of a RAN-based I-UPF, according to an embodiment.

FIG. 12 is a diagram for describing a procedure to cope with a case where whether a UPF is modified or not is not known in a handover preparation process of a RAN (e.g., an Xn-based handover) in the third embodiment described above.

In operation 0, the AF may transmit an AF influence on traffic routing request to the SMF via an NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, RAN 1 and 2 may detect a handover occurring from RAN 1 to RAN 2 according to movement of the user equipment, and a handover preparation procedure may be performed.

In operation 2, when a handover procedure between the RANs is completed, a RAN connected to the user equipment may be migrated from RAN1 to RAN2. Moreover, insertion of an I-UPF may take place. Here, the I-UPF may have to be simultaneously connectable to RAN 1 and RAN 2. Creation of the I-UPF and connection thereof to RAN 1 are possible also in operation 1, but connection thereof to RAN 2 may be performed in the present operation. Next, communication between the user equipment and MEC may be performed via RAN 2, the I-UPF, and UPF 1.

In operation 3, the SMF may transmit an early notification related to a modification of the UPF to the AF. Here, the SMF may transmit a GPSI of a related UE and an address of a current UE. Also, the SMF may further transmit a location of the current UE. GPSI may be used to identify an UE by the AF, and the GPSI or an external ID or MSISDN may be transmitted. The location of the UE is a factor that is selectively transmitted to the AF to optimize a path between DNAI and DN. Based on this, in an MEC node or an intermediate transmission network, a path between the user equipment and MEC may be optimized.

In operation 4, the SMF may determine insertion of UPF2 to optimize a data transmission path and select a destination UPF.

In operation 5, the SMF may generate a connection to UPF2 and set UPF2 such that data is transmitted to the I-UPF.

In operation 6, after the connection to UPF 2 is completed, the SMF may transmit, to the AF, GPSI, an address of the UE at UPF2 to identify the user equipment. Here, an address of UPF 1 may also be transmitted to the AF.

In operation 6-1, the AF that has received a notification from the SMF may notify the MEC node that the address of the UE may be modified. Also, the AF may allow to reconfigure a previous connection by using a new address, that is, a user equipment address allocated in UPF2, with respect to a connection to a UE corresponding to the GPSI.

Loss may occur in data generated in the user equipment while operation 6-1 is performed when the data is transmitted via UPF 2. Accordingly, to prevent this, in operation 7, the data generated in the user equipment may be set to be transmitted via the previous UPF1. The SMF may wait for a period of time needed for reconfiguration, the period of time received from the AF in operation 0.

In operation 8, the AF may start migration of data needed for providing a service to a UE from MEC 1 to MEC 2 (e.g., a virtual machine image, a service-related context), and calculate a period of time needed for the needed migration. Next, the AF may transmit a new AF influence on traffic routing request or update a previous request (see Table 3). Here, the AF may also transmit a period of time needed for the migration. Operation 8 may be selectively provided.

In operation 8-1, the SMF may wait for the migration time.

In operation 9, a QoS flow corresponding to the UE receiving a service in UPF1 may be migrated to UPF 2. Moreover, the SMF may update the I-UPF to allow the data generated in the user equipment to be transmitted to the MEC via UPF 2.

In operation 10, the SMF may release the connection between the I-UPF and UPF 1 and reconfigure UPF 2 and RAN 2 to allow direct data transmission.

Fifth Embodiment

Figure 13:
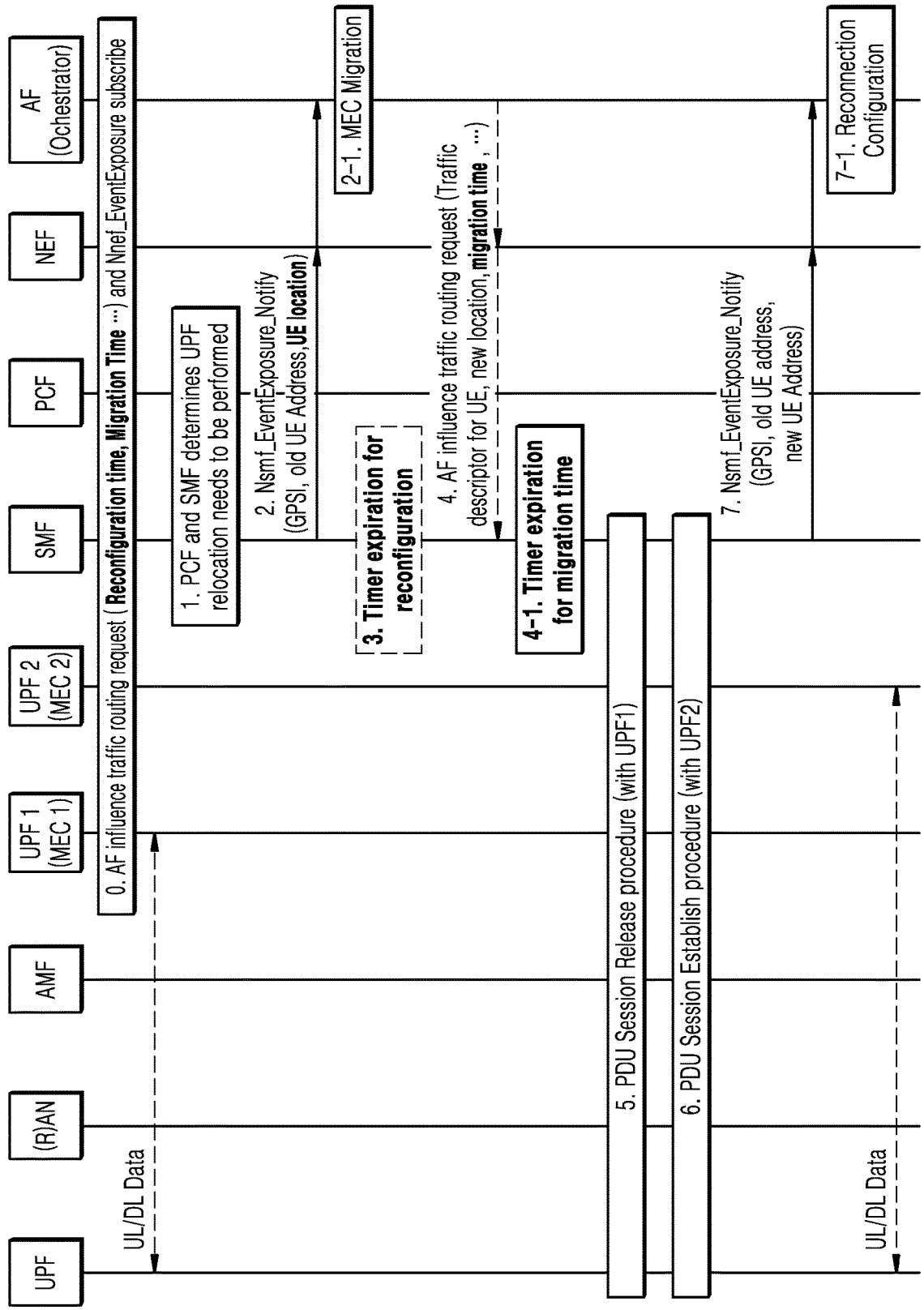
FIG. 13 is a diagram illustrating a PDU session migration method for connection to a different MEC, the method using Session and Service Continuity (SSC) MODE2, according to an embodiment.

FIG. 13 is a diagram for describing a method and procedure for supporting migration corresponding to FIG. 4. The fifth embodiment of the disclosure is an application of a procedure for supporting Session and Service Continuity (SSC) which is a method for supporting continuity of a session and a service in the 5GC. In particular, the present embodiment may be part of a process following an order of stopping a session and creating a new one, which is an SSC mode 2 method. Based on an SSC mode 2 procedure of the previous 5GC, when a session is stopped and a new session is created based on whether a UPF is prepared, only by considering a situation of the 5GC, because MEC is not yet migrated, disconnection of services may be caused. Moreover, MEC does not know a modified address of the UE, and thus, when continuity of services is not supported at an application end, the user equipment may be regarded as a new user equipment and services may have to start anew. To address this problem, according to the present embodiment, information related to a modification of a user equipment is transmitted to MEC, and when migration is necessary, the MEC may transmit a period of time needed for the migration of the MEC.

In operation 0, the AF may transmit an AF influence on traffic routing request to the SMF via an NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary (i.e., required). Furthermore, in an MEC node or an intermediate transmission network, a path between the user equipment and MEC may be optimized.

In operation 2-1, the AF may start migration of data needed for providing a service to a UE from MEC 1 to MEC 2 (e.g., a virtual machine image, a service-related context), and calculate a period of time needed for the needed migration. Next, the AF may transmit a new AF influence on traffic routing request or update a previous request (see Table 3). Here, the AF may also transmit a period of time needed for the migration. Operation 2-1 may be selectively provided.

In operation 3, the SMF may wait for the MEC reconfiguration time (Table 3) in the AF influence on traffic routing request.

In operation 4, while waiting for the MEC reconfiguration time, the SMF may receive the AF influence on traffic routing request generated through operation 2-1, from the AF. When the SMF receives no request, the method may proceed to the next operation. Operation 4 may be selectively provided.

In operation 4-1, when receiving an AF influence on traffic routing request, the SMF may recognize that a certain period of time is required for the MEC to prepare and may wait for that time.

In operation 5, a previous PDU session may be released according to the SSC Mode 2 procedure.

In operation 6, a new PDU session may be created according to the SSC Mode 2 procedure.

In operation 7, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, a previous UE address may also be transmitted.

In operation 7-1, the AF may modify a service connection by using the received new address of the UE.

Sixth Embodiment

Figure 14:
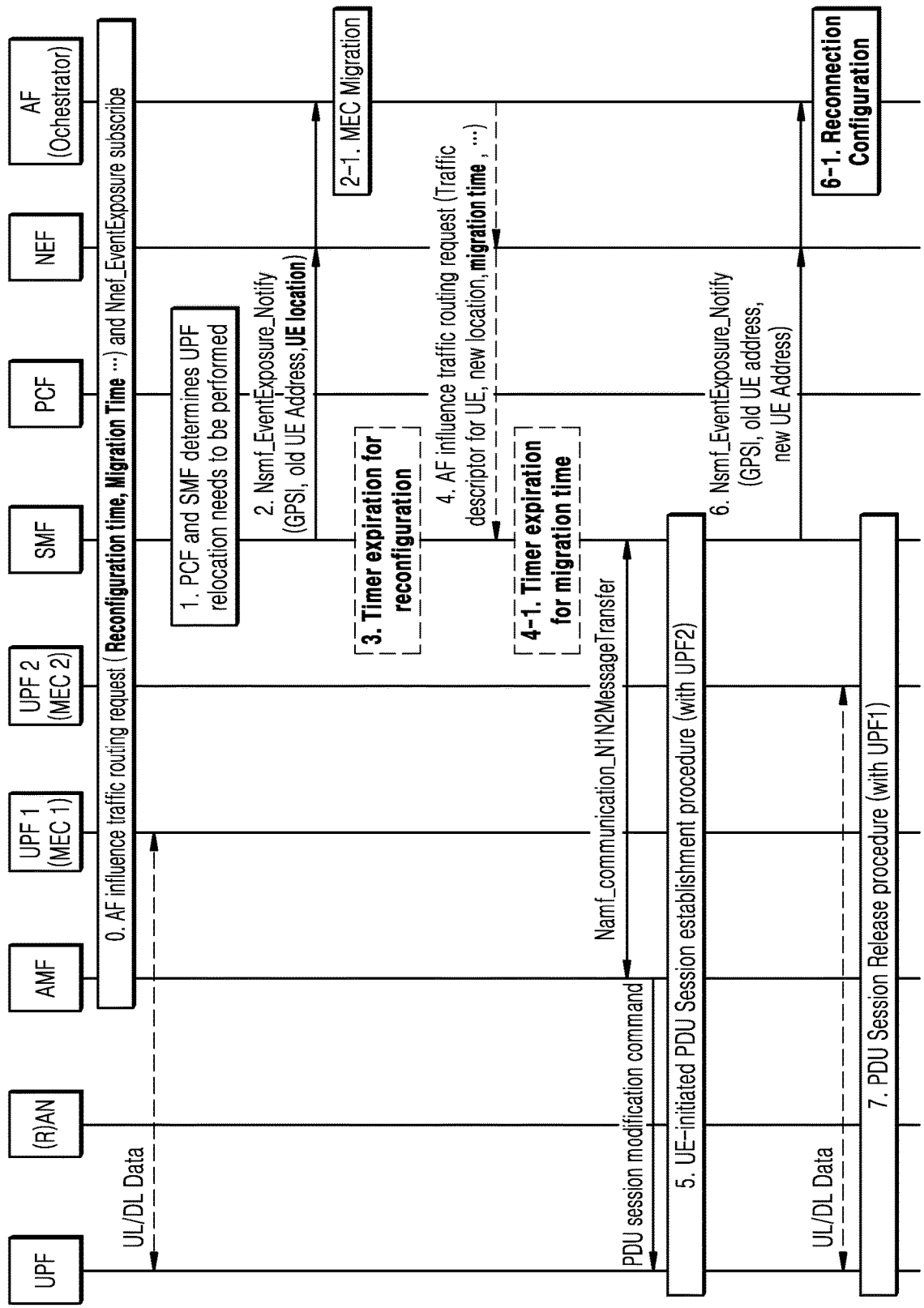
FIG. 14 is a diagram illustrating a PDU session migration method for connection to a different MEC, the method using SSC MODE3, according to an embodiment.

FIG. 14 is a diagram for describing a method and procedure for supporting migration corresponding to FIG. 4. In detail, FIG. 14 is a diagram for describing a method of using SSC Mode 3 in the fifth embodiment described above. SSC Mode 3 follows an order of first generating a new connection for migration of a PDU session and then releasing a previous connection.

In operation 0, the AF may transmit an AF influence on traffic routing request to the SMF via an NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

In operation 2-1, the AF may start migration of data needed for providing a service to a UE from MEC 1 to MEC 2 (e.g., a virtual machine image, a service-related context), and calculate a period of time needed for the needed migration. Next, the AF may transmit a new AF influence on traffic routing request or update a previous request (see Table 3). Here, the AF may also transmit a period of time needed for the migration. Operation 2-1 may be selectively provided.

In operation 3, the SMF may wait for the MEC reconfiguration time (Table 3) in the AF influence on traffic routing request.

In operation 4, while waiting for the MEC reconfiguration time, the SMF may receive the AF influence on traffic routing request generated through operation 2-1, from the AF. When the SMF receives no request, the method may proceed to the next operation. Operation 4 may be selectively provided.

In operation 4-1, when receiving an AF influence on traffic routing request, the SMF may recognize that a certain period of time is required for the MEC to prepare and may wait for that time.

In operation 5, a new PDU session may be created according to the SSC Mode 3 procedure.

In operation 6, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, a previous UE address may also be transmitted.

In operation 6-1, the AF may modify a service connection by using the received new address of the UE.

In operation 7, the PDU session may be modified and the previous PDU session may be released according to the SSC Mode 3 procedure.

Seventh Embodiment

Figure 15:
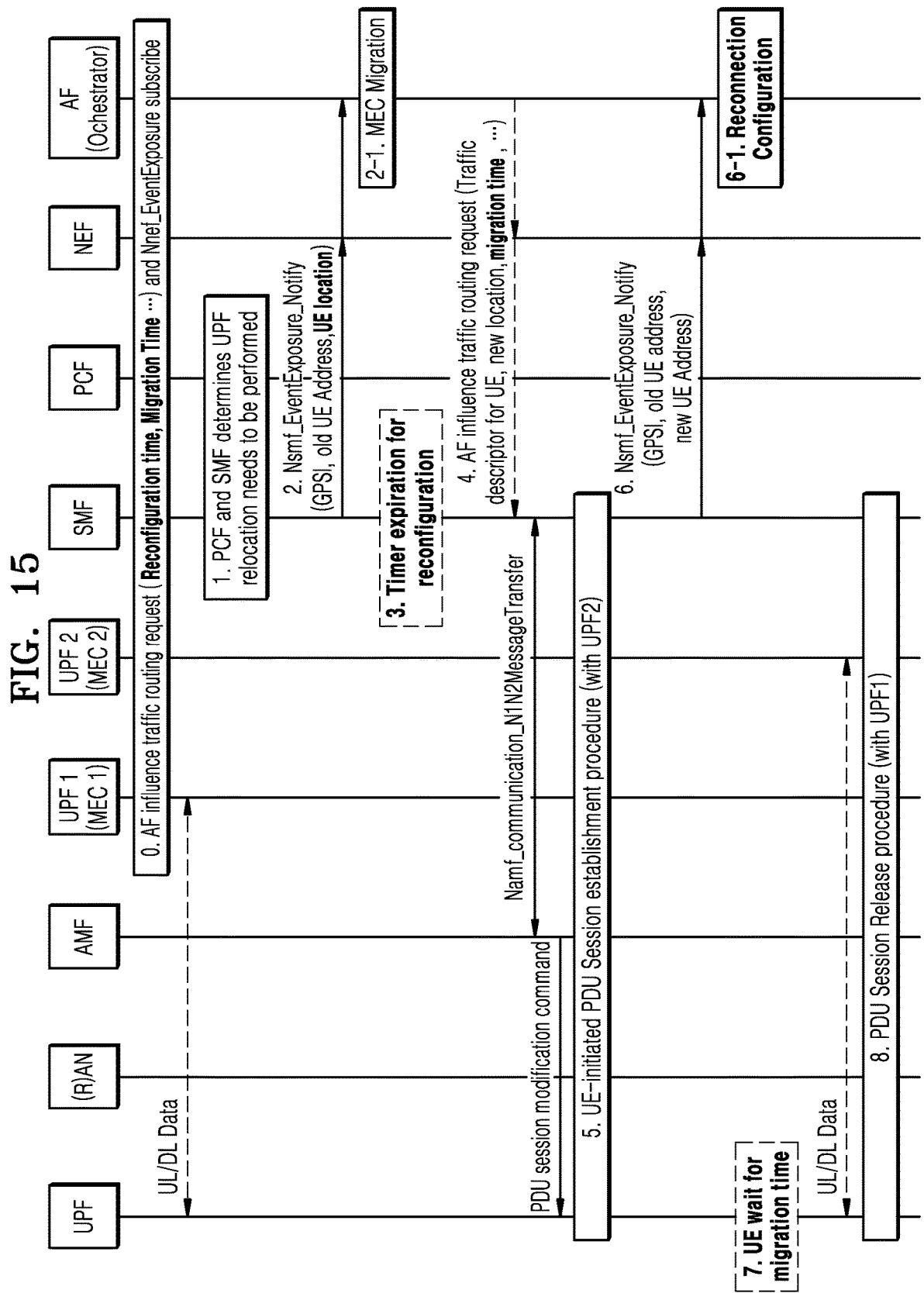
FIG. 15 is a diagram illustrating a PDU session migration method for connection to a different MEC, wherein SSC MODE3 is used in the method and the method is based on a user equipment, according to an embodiment.

FIG. 15 is a diagram for describing a method and procedure for supporting migration corresponding to FIG. 4. The seventh embodiment of the disclosure relates to a case in which, when using SSC Mode 3 in the fifth embodiment, the SMF that waits during a migration time notifies the user equipment of a time when a PDU session is modified, and the user equipment adjusts and applies a time for using a new PDU session.

In operation 0, the AF may transmit an AF influence on traffic routing request to the SMF via an NEF with respect to a particular user equipment or service flow. Here, the AF may add a newly added reconfiguration time to the request factor and transmit the same. Next, the user equipment may use a service located in MEC 1 via RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

In operation 2-1, the AF may start migration of data needed for providing a service to a UE from MEC 1 to MEC 2 (e.g., a virtual machine image, a service-related context), and calculate a period of time needed for the needed migration. Next, the AF may transmit a new AF influence on traffic routing request or update a previous request (see Table 3). Here, the AF may also transmit a period of time needed for the migration. Operation 2-1 may be selectively provided.

In operation 3, the SMF may wait for the MEC reconfiguration time (Table 3) in the AF influence on traffic routing request.

In operation 4, while waiting for the MEC reconfiguration time, the SMF may receive the AF influence on traffic routing request generated through operation 2-1, from the AF. When the SMF receives no request, the method may proceed to the next operation. Operation 4 may be selectively provided.

In operation 5, a new PDU session is created according to the SSC Mode 3 procedure. Here, the user equipment is notified of a period of time needed for MEC migration, and allowed to wait for the needed time in operation 7.

In operation 6, the SMF may notify the AF of a new address of the UE. Here, the SMF may allow to reconfigure a previous connection by using a new address, that is, a user equipment address allocated in UPF2, with respect to a connection to a UE corresponding to the GPSI. Additionally, a previous UE address may also be transmitted.

In operation 6-1, the AF may modify a service connection by using the received new address of the UE.

In operation 7, when receiving an AF influence on traffic routing request, the UE may recognize that a certain period of time is required for the MEC to prepare and may wait for that time.

In operation 8, the PDU session may be modified and the previous PDU session may be released according to the SSC Mode 3 procedure.

Eighth Embodiment

Figure 16:
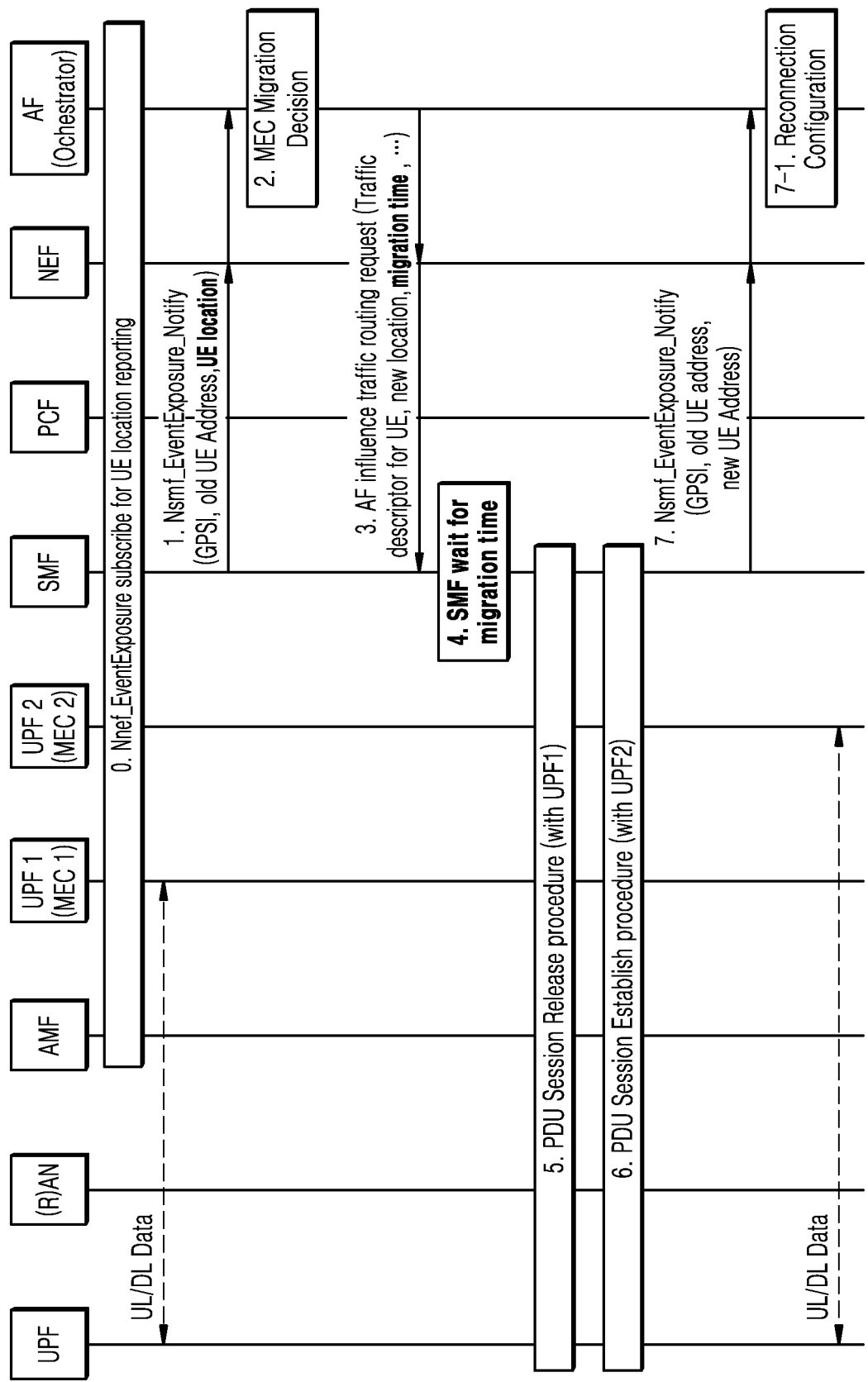
FIG. 16 is a diagram illustrating a method of using SSC MODE2 and modifying a PDU session migration procedure for connection to an MEC according to a request from an AF, according to an embodiment.

FIG. 16 is a diagram for describing a method and procedure for supporting migration corresponding to FIG. 4. The eighth embodiment of the disclosure relates to a procedure for dynamically modifying network traffic of a user equipment to a particular MEC in a situation where the AF receives a report on position information of the user equipment via the SMF or the PCF. Here, the AF receiving a report on a location of the user equipment in real time may perform a procedure for maintaining continuity of services by dynamically notifying the AF influence on traffic routing request and a period of time needed for MEC at a particular location to be migrated or prepared. The present embodiment relates to an example in which SSC Mode 2 is used when using MEC2 instead of the previous MEC1.

In operation 0, in order to be able to receive a report on a location of a particular user equipment, the AF may request event subscription from the PCF or the SMF via an NEF. The user equipment may use a service located in MEC 1 via RAN 1 and UPF 1.

In operation 1, the PCF and the SMF may report a location of the user equipment according to movement of the user equipment, to the AF via the NEF. Here, the SMF may transmit a GPSI of a related UE and an address of a current UE. Also, the SMF may additionally transmit a location of the current UE. The location of the UE may be obtained by receiving, by the SMF or the PCF, an event of an AMF. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

In operation 2, the AF may start migration of data needed for providing a service to a UE from MEC 1 to MEC 2 (e.g., a virtual machine image, a service-related context), and calculate a period of time needed for the needed migration.

In operation 3, the AF may then transmit an AF influence on traffic routing request anew (see Table 3). Here, the AF may also transmit a period of time needed for the migration.

In operation 4, the SMF may wait for the MEC reconfiguration time (Table 3) in the AF influence on traffic routing request.

In operation 5, a previous PDU session may be released according to the SSC Mode 2 procedure.

In operation 6, a new PDU session may be created according to the SSC Mode 2 procedure.

In operation 7, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, a previous UE address may also be transmitted.

In operation 7-1, the AF may modify a service connection by using the received new address of the UE.

Ninth Embodiment

Figure 17:
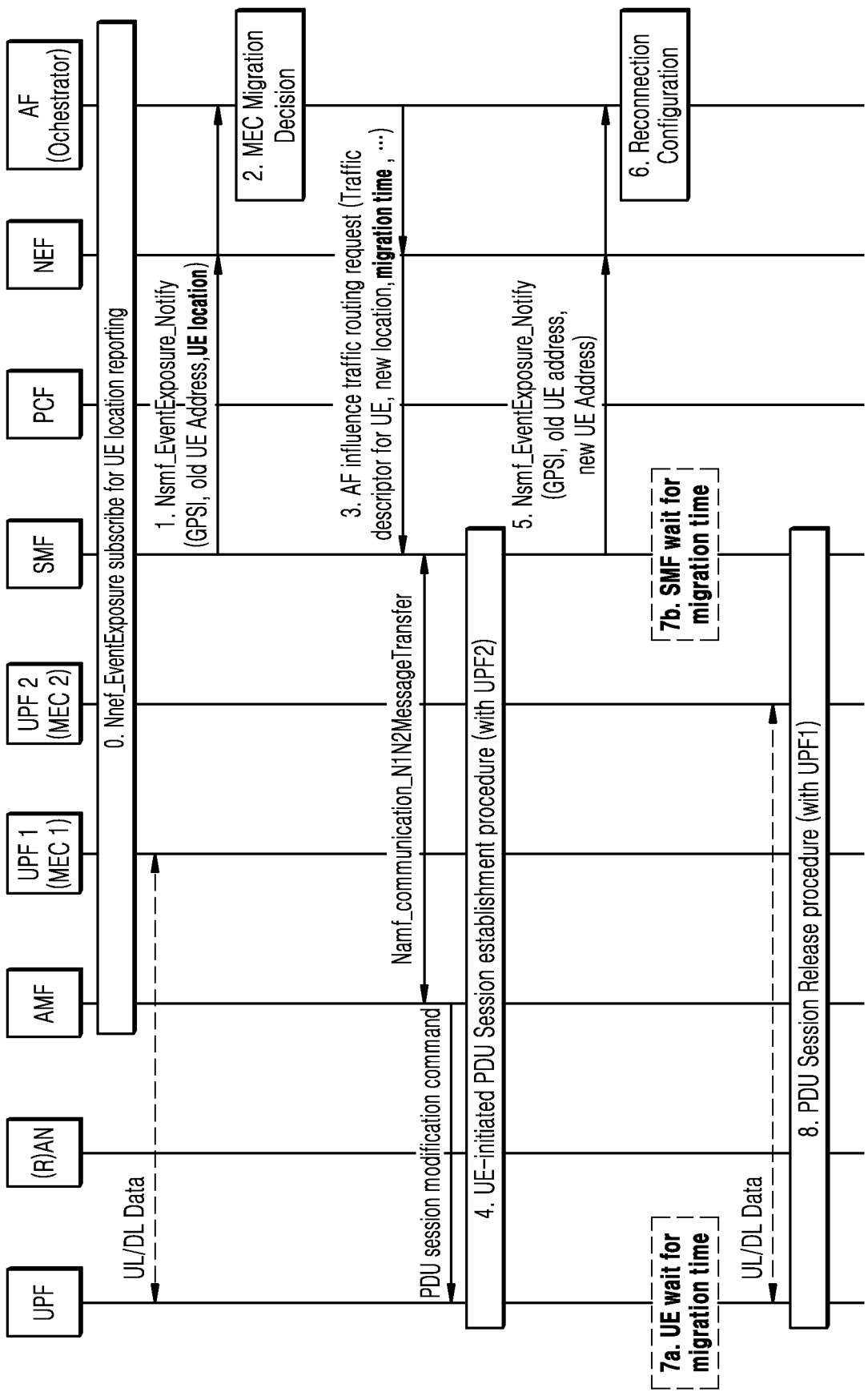
FIG. 17 is a diagram illustrating a method of using SSC MODE3 and modifying a PDU session migration procedure for connection to an MEC according to a request from an AF, according to an embodiment.

FIG. 17 is a diagram for describing a method and procedure for supporting migration corresponding to FIG. 4. The ninth embodiment of the disclosure relates to using SSC Mode 3 in the eighth embodiment.

In operation 0, in order to be able to receive a report on a location of a particular user equipment, the AF may request event subscription from the PCF or the SMF via an NEF. The user equipment may use a service located in MEC 1 via RAN 1 and UPF 1.

In operation 1, the PCF and the SMF may report a location of the user equipment according to movement of the user equipment, to the AF via the NEF. Here, the SMF may transmit a GPSI of a related UE and an address of a current UE. Also, the SMF may additionally transmit a location of the current UE. The location of the UE may be obtained by receiving, by the SMF or the PCF, an event of an AMF. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

In operation 2, the AF may start migration of data needed for providing a service to a UE from MEC 1 to MEC 2 (e.g., a virtual machine image, a service-related context), and calculate a period of time needed for the needed migration.

In operation 3, the AF may then transmit an AF influence on traffic routing request anew (see Table 3). Here, the AF may also transmit a period of time needed for the migration.

In operation 4, a new PDU session may be created according to the SSC Mode 3 procedure.

In operation 5, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, a previous UE address may also be transmitted.

In operation 6, the AF may modify a service connection by using the received new address of the UE.

In operation 7, during the migration time received in operation 3, entities included in a network may wait. The waiting subject may be the user equipment (operation 7a) or 5GC (operation 7b).

In operation 8, the PDU session may be modified and the previous PDU session may be released according to the SSC Mode 3 procedure.

Tenth Embodiment

The tenth embodiment of the disclosure is for describing a method and procedure for supporting migration corresponding to FIG. 4. The tenth embodiment of the disclosure is an application of a procedure for supporting Session and Service Continuity (SSC) which is a method for supporting continuity of a session and a service in the 5GC.

In the embodiment of the disclosure, when initially transmitting an influence on traffic routing request, the AF may explicitly transmit information indicating whether UPF modification is allowed, thereby preventing a modification of a UPF when the AF is not ready. Next, when the AF is ready for a modification of a UPF, the AF may dynamically transmit an AF influence on traffic routing request to a particular user equipment as a target, thereby controlling the modification of the UPF. In the disclosure, a "modification of a UPF" may include, for example, configuring a new UPF or activating a connection to a new UPF. For example, a "modification of a UPF" may include configuring a new UPF after the SMF transmits an early notification to the AF. Alternatively, a "modification of a UPF" may include configuring, by the SMF, a new UPF and transmitting a late notification to the AF and then activating a connection to the new UPF. Accordingly, an operation of determining, performed by the SMF, whether to wait for a response from the AF, according to "whether UPF modification is allowed," may apply to both a procedure related to an early notification and a procedure related to a late notification.

Table 4 is a table describing factors used in the present embodiment. In the embodiment, to the AF influence on traffic routing request previously defined in TS 23.501, whether a UPF is to be modified (Allow reallocation of UPF) and a migration time may be newly added as factors. In the embodiment, each factor may be separately used. Whether a UPF is to be modified may indicate, when a modification of a UPF is necessary according to 5GC internal policy, whether the PCF or SMF is going to allow migration of such a PDU session. When the above factor is configured as 'not allowing,' the SMF may not modify the UPF even when a modification of the UPF is necessary according to the internal policy. However, also in this case, the SMF may continuously perform an operation of transmitting, to the AF, a notification informing that a UPF modification is needed.

In the embodiment, a migration time is a factor that is used by the AF to respond to the SMF via the PCF after receiving a notification regarding a modification of the UPF, and may be used to notify a period of time required to prepare migration of a particular UE. Thus, the SMF may perform migration of a PDU session by considering a migration time of a particular UE, the migration time being newly received from the AF. The present embodiment relates to an example in which SSC Mode2 is used when using MEC2 instead of the previous MEC1.

TABLE 4

| Information Name | Applicable for PCF or NEF (NOTE 1) | Applicable for NEF only | Category |
| --- | --- | --- | --- |
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s). | The potential locations of applications can be represented by AF-Service-Identifier | Conditional (NOTE 2) |
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | N6 traffic routing information corresponding to each DNAI, | N/A | Optional |
| Application Relocation Possibility | Indicates whether an application can be relocated once a location of the application is selected by the 5GC. | N/A | Optional |
| Temporal Validity Condition | Time interval(s) or duration(s), | N/A | Optional |
| Information on AF subscription to corresponding SMF events | Indicates whether the AF subscribes to change of UP path of the PDU Session and the parameters of this subscription. | N/A | Optional |
| Allow reallocation of UPF | Indicate the serving UPF can be reallocated by local policy. | N/A | Optional |
| Migration Time | Required time for migrating sessions from the old location to the new location | N/A | Optional |

(NOTE 1):
When the AF request targets existing or future PDU Sessions of multiple UE(s) or of any UE and is sent via the NEF, as described in clause 6.3.7.2, the information is stored in the UDR by the NEF and notified to the PCF by the UDR.
(NOTE 2):
The potential locations of applications and traffic routing requirements may be absent only if the request is for subscription to notifications about UP path management events only.

Figure 18:
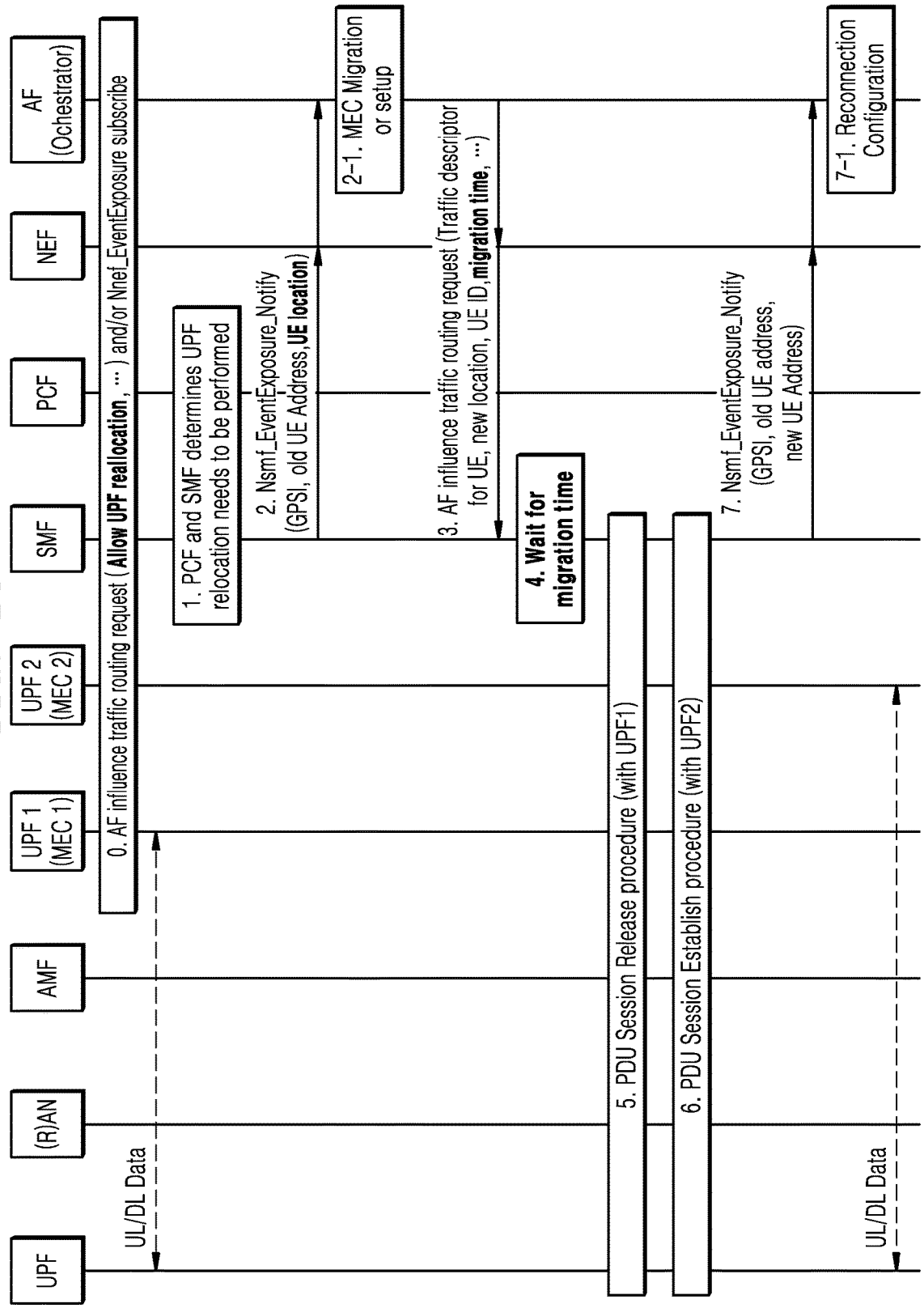
FIG. 18 is a diagram illustrating a method of using SSC MODE2 and modifying a PDU session migration procedure by using whether migration of a UPF is allowed, according to a request from an AF, according to an embodiment.

FIG. 18 is a diagram illustrating a method of modifying a PDU session migration procedure according to the tenth embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC 1 by using RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, when a modification of a UPF is allowed in an initially received AF request, the SMF may immediately perform operation 5. When not allowed, the SMF may wait for reception of a new AF request from the AF. A maximum value of a waiting time may be determined according to the internal policy.

In operation 2-1, the AF may start migration of data needed for providing a service to a UE from MEC 1 to MEC 2 (e.g., a virtual machine image, a service-related context), and calculate a period of time needed for the needed migration.

In operation 3, the AF may transmit a new AF influence on traffic routing request or update a previous request (see Table 4). Here, the AF may also transmit a period of time needed for the migration. In order not to affect other user equipment, when transmitting a new AF request, the AF may limit a target by using a target UE identifier. In the case of updating, the AF may designate a previous AF request to be updated, by using an AF transaction identifier.

In operation 4, the SMF may wait for the MEC migration time. Here, by considering a period of time needed for an SSC Mode operation later, the SMF may wait for a shorter period than the migration time included in the AF request.

In operation 5, a previous PDU session may be released according to the SSC Mode 2 procedure.

In operation 6, a new PDU session may be created according to the SSC Mode 2 procedure.

In operation 7, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, a previous UE address may also be transmitted.

In operation 7-1, the AF may modify a service connection by using the received new address of the UE.

Eleventh Embodiment

The eleventh embodiment of the disclosure is for describing a method and procedure for supporting migration corresponding to FIG. 4. The eleventh embodiment relates to a method of using the SSC Mode 3 procedure in the tenth embodiment described above. In the embodiment, a factor used in an AF influence on traffic routing request of the eleventh embodiment may be identical to that of the tenth embodiment.

Figure 19:
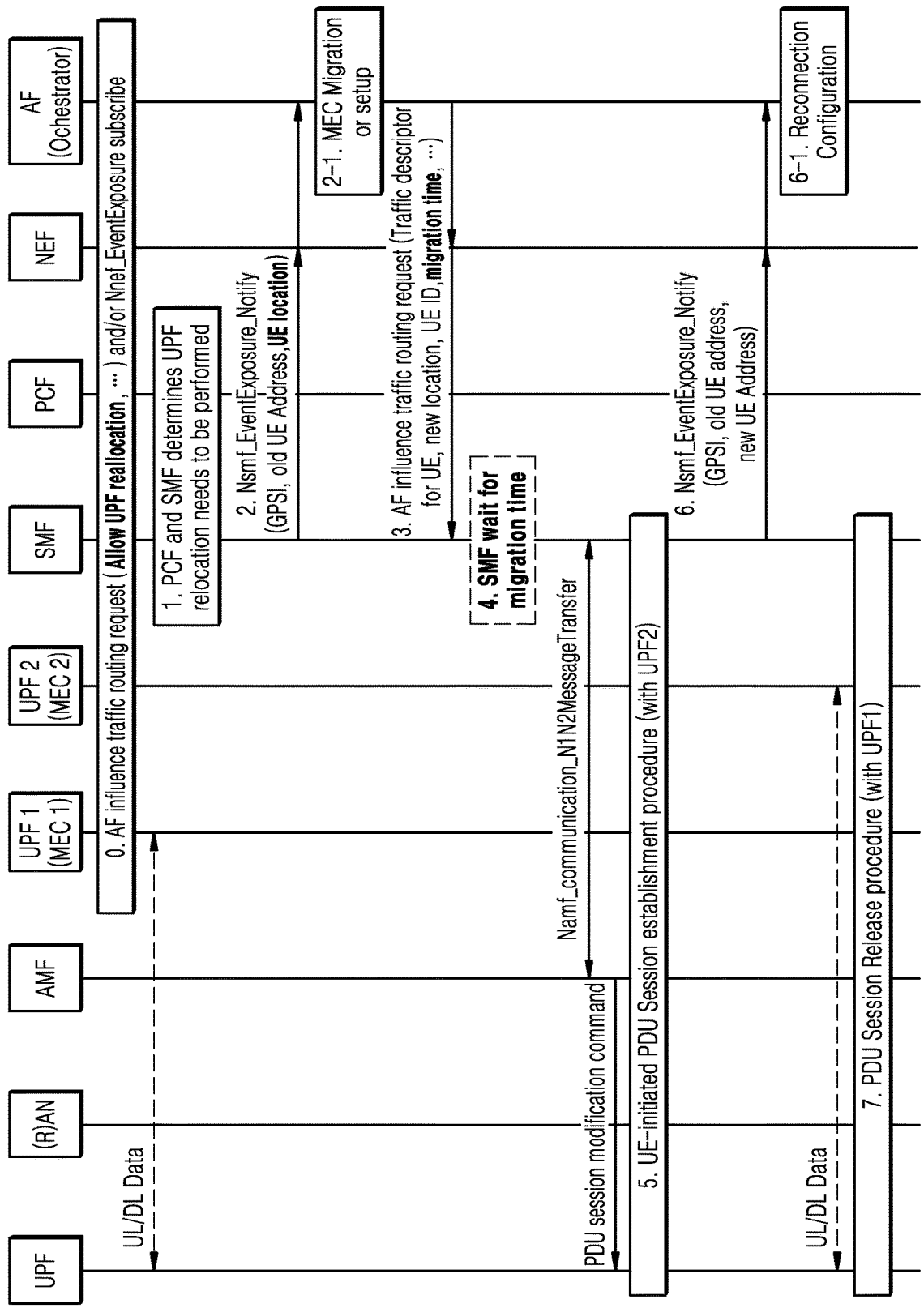
FIG. 19 is a diagram illustrating a method of using SSC MODE3 and modifying a PDU session migration procedure by using whether migration of a UPF is allowed, according to a request from an AF, according to an embodiment.

FIG. 19 is a diagram illustrating a method of modifying a PDU session migration procedure according to the eleventh embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC 1 by using RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, when a modification of a UPF is allowed in an initially received AF request, the SMF may immediately perform operation 5. When not allowed, the SMF may wait for reception of a new AF request from the AF. A maximum value of a waiting time may be determined according to the internal policy.

In operation 2-1, the AF may start migration of data needed for providing a service to a UE from MEC 1 to MEC 2 (e.g., a virtual machine image, a service-related context), and calculate a period of time needed for the needed migration.

In operation 3, the AF may transmit a new AF influence on traffic routing request or update a previous request (see Table 4). Here, the AF may also transmit a period of time needed for the migration. When transmitting a new AF request, in order not to affect other user equipment, the AF may limit a target by using a target UE identifier. In the case of updating, the AF may designate a previous AF request to be updated, by using an AF transaction identifier.

In operation 4, the SMF may wait for the MEC migration time. Here, by considering a period of time needed for an SSC Mode operation later, the SMF may wait for a shorter period than the migration time included in the AF request.

In operation 5, a new PDU session may be created according to the SSC Mode 3 procedure. Here, the SMF may notify the user equipment of a period of time needed for MEC migration, and allow the user equipment to wait for the needed time in operation 7.

In operation 6, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the AMF may also transmit a previous UE address.

In operation 6-1, the AF may modify a service connection by using the received new address of the UE.

In operation 7, the PDU session may be modified and the previous PDU session may be released according to the SSC Mode 3 procedure.

Twelfth Embodiment

The twelfth embodiment of the disclosure is for describing a method and procedure for supporting migration corresponding to FIG. 4. The twelfth embodiment relates to a method of using the SSC Mode 3 procedure in the eleventh embodiment described above and using a Release Timer determining a point of time of migration after a user equipment has created a new PDU session, in respect of a waiting time for migration of MEC. In the embodiment, a factor used in an AF influence on traffic routing request of the twelfth embodiment may be identical to that of the tenth embodiment.

Figure 20:
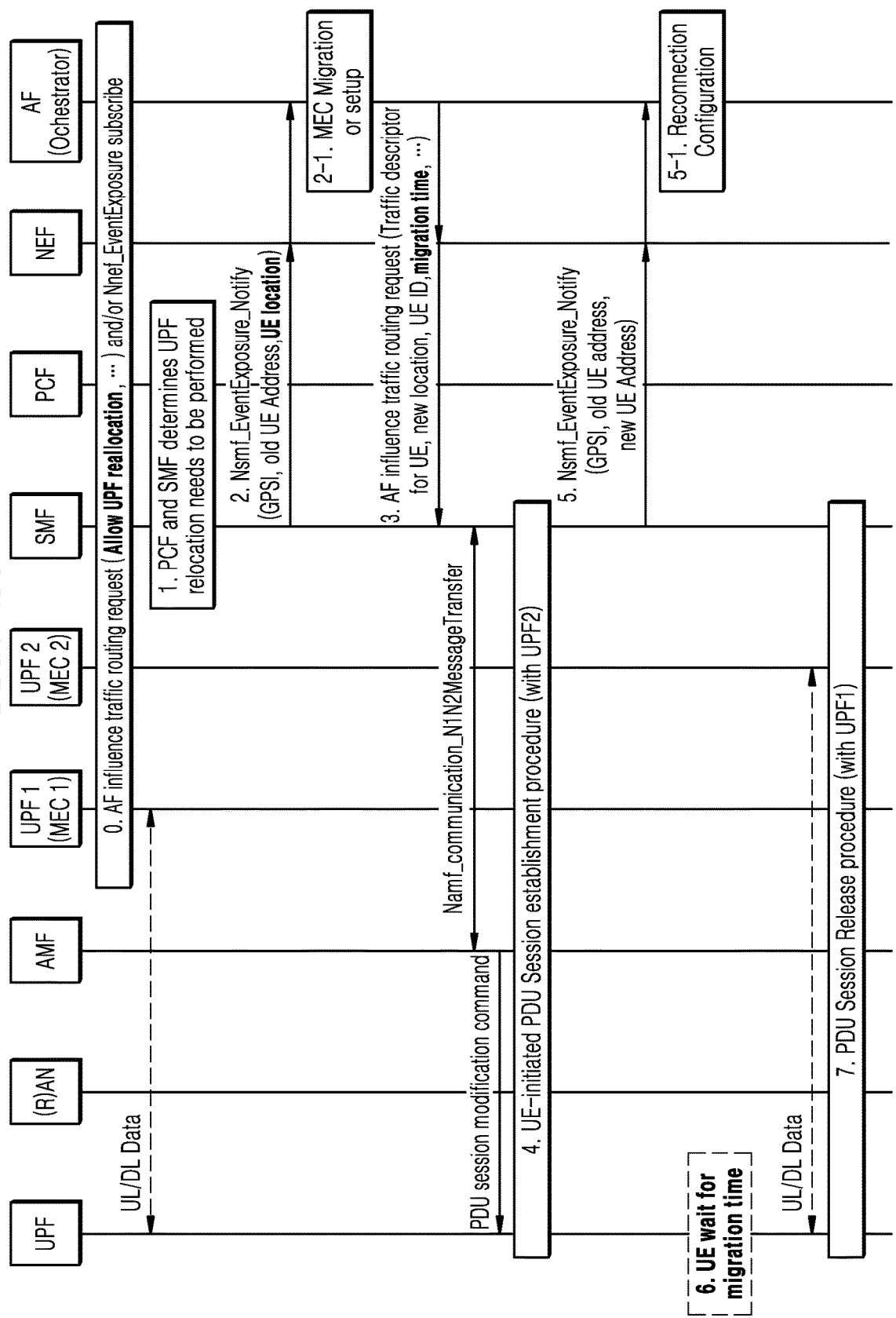
FIG. 20 is a diagram illustrating a method of using SSC MODE3 and modifying a PDU session migration procedure by using whether migration of a UPF is allowed based on a user equipment, according to a request from an AF, according to an embodiment.

FIG. 20 is a diagram illustrating a method of modifying a PDU session migration procedure according to the twelfth embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, a user equipment may use a service located in MEC1 by using RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, when a modification of a UPF is allowed in an initially received AF request, the SMF may immediately perform operation 5. When not allowed, the SMF may wait for reception of a new AF request from the AF. A maximum value of a waiting time may be determined according to the internal policy.

In operation 2-1, the AF may start migration of data needed for providing a service to a UE from MEC 1 to MEC 2 (e.g., a virtual machine image, a service-related context), and calculate a period of time needed for the needed migration.

In operation 3, the AF may transmit a new AF influence on traffic routing request or update a previous request (see Table 4). Here, the AF may also transmit a period of time needed for the migration. When transmitting a new AF request, in order not to affect other user equipment, the AF may limit a target by using a target UE identifier. In the case of updating, the AF may designate a previous AF request to be updated, by using an AF transaction identifier.

In operation 4, a new PDU session may be created according to the SSC Mode 3 procedure. Here, the SMF may notify the user equipment of a period of time needed for MEC migration, and allow the user equipment to wait for the needed time in operation 7.

In operation 5, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the SMF may also transmit a previous UE address.

In operation 5-1, the AF may modify a service connection by using the received new address of the UE.

In operation 6, the user equipment may be wait for the migration time received in operation 4 from the SMF.

In operation 7, the PDU session may be modified and the previous PDU session may be released according to the SSC Mode 3 procedure.

Thirteenth Embodiment

The thirteenth embodiment of the disclosure is for describing a method and procedure for supporting migration corresponding to FIG. 4. The thirteenth embodiment of the disclosure is an application of a procedure for supporting Session and Service Continuity (SSC) which is a method for supporting continuity of a session and a service in the 5GC.

In the embodiment of the disclosure, when initially transmitting an influence on traffic routing request, the AF may explicitly transmit information indicating whether a modification of a UPF is allowed, thereby preventing a modification of a UPF when the AF is not ready. Next, when the AF is ready for a modification of a UPF, the AF may dynamically transmit an AF influence on traffic routing request to a particular user equipment as a target, thereby controlling the modification of the UPF.

Table 5 is a table describing factors used in the present embodiment. In the embodiment, to the AF influence on traffic routing request previously defined in TS 23.501, whether a UPF is to be modified (Allow reallocation of UPF) may be newly added as a factor. Whether a UPF is to be modified may indicate, when a modification of a UPF is necessary according to 5GC internal policy, whether the PCF or SMF is going to allow migration of such a PDU session. When the above factor is configured as 'not allowing,' the SMF may not modify the UPF even when a modification of the UPF is necessary according to the internal policy. However, also in this case, the SMF may continuously perform an operation of transmitting, to the AF, a notification informing that a UPF modification is needed.

In the present embodiment, the AF may transmit an AF request for a particular user equipment after migration of resources and information needed to continuously support a service of that particular user equipment is completed. Unlike the tenth, eleventh, or twelfth embodiment in which the AF explicitly transmits a migration time via an AF influence on traffic routing request, the AF according to the present embodiment may transmit an AF influence on traffic routing request after the migration is completed. The SMF that has received the request may immediately perform a next operation for migration of a PDU session. The present embodiment relates to an example in which SSC Mode 2 is used when using MEC2 instead of the previous MEC1.

TABLE 5

| Information Name | Applicable for PCF or NEF (NOTE 1) | Applicable for NEF only | Category |
|---|---|---|---|
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. | Mandatory |
| Potential Locations of Applications | Indicates potential locations of applications, represented by a list of DNAI(s), | The potential locations of applications can be represented by AF-Service-Identifier, | Conditional (NOTE 2) |

TABLE 5-continued

| Information Name | Applicable for PCF or NEF (NOTE 1) | Applicable for NEF only | Category |
|---|---|---|---|
| Target UE Identifier(s) | Indicates the UE(s) that the request is targeting, i.e. an individual UE, a group of UE represented by Internal Group Identifier, or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity, | The specified location can be represented by a list of geographic zone identifier(s). | Optional |
| AF transaction identifier | The AF transaction identifier refers to the AF request. | N/A | Mandatory |
| Traffic Routing: requirements | N6 traffic routing information corresponding to each DNAI. | N/A | Optional |
| Application Relocation Possibility | Indicates whether an application can be relocated once a location of the application is selected by the 5GC. | N/A | Optional |
| Temporal Validity Condition | Time interval(s) or duration(s). | N/A | Optional |
| Information on AF subscription to corresponding SMF events | Indicates whether the AF subscribes to change of UP path of the PDU Session and the parameters of this subscription. | N/A | Optional |
| Allow reallocation of UPF | Indicate the serving UPF can be reallocated by local policy. | N/A | Optional |

(NOTE 1):
When the AF request targets existing or future PDU Sessions of multiple UE(s) or of any UE and is sent via the NEF, as described in clause 6.3.7.2, the information is stored in the UDR by the NEF and notified to the PCF by the UDR.
(NOTE 2):
The potential locations of applications and traffic routing requirements may be absent only if the request is for subscription to notifications about UP path management events only.

Figure 21:
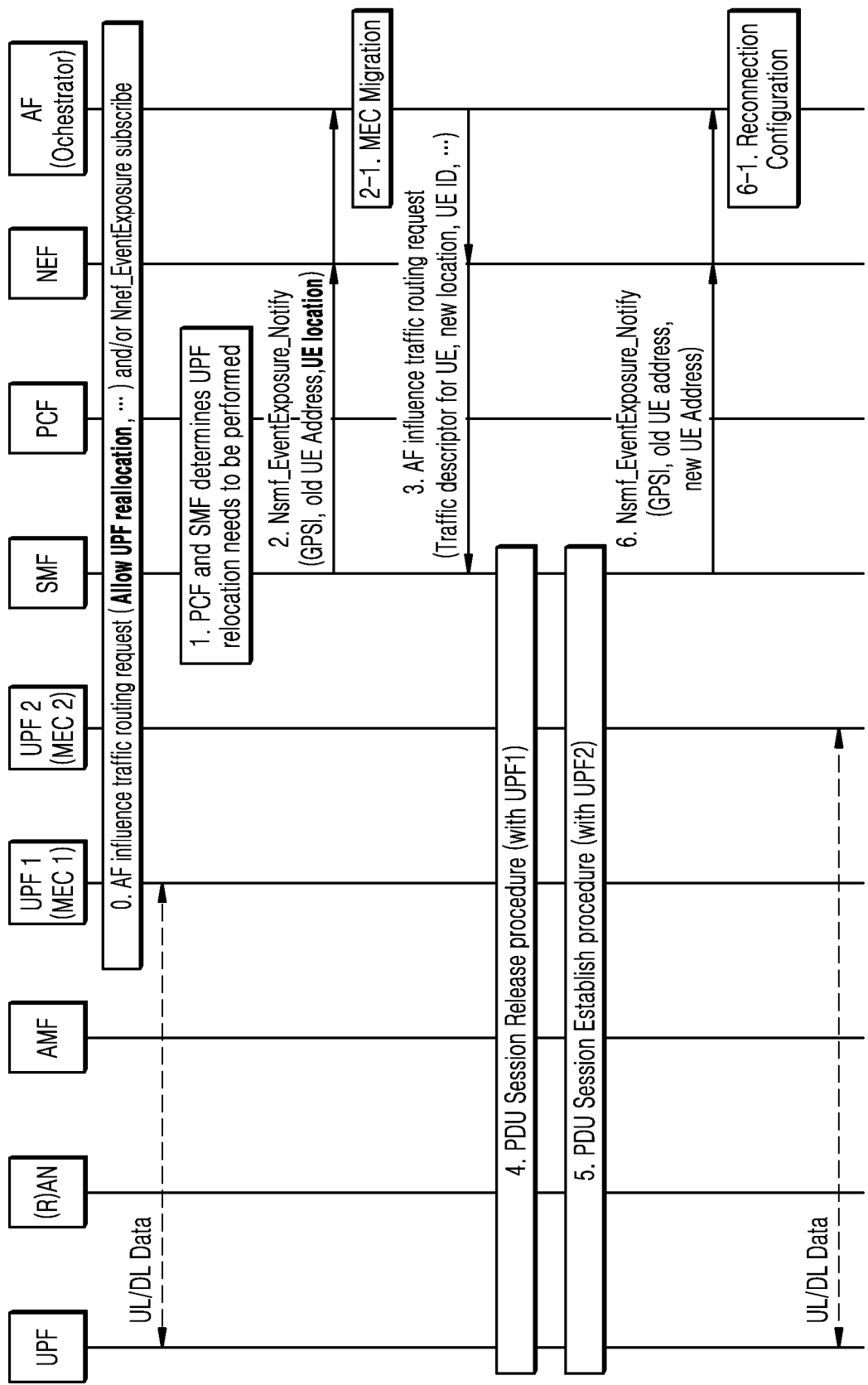
FIG. 21 is a diagram illustrating a method of using a factor indicating whether a modification of a UPF is allowed and using SSC MODE2 and modifying a PDU session according to a request from an AF when migration of the AF is completed, according to an embodiment.

FIG. 21 is a diagram illustrating a method of modifying a PDU session migration procedure according to the tenth embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC1 by using RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, when a modification of a UPF is allowed in an initially received AF request, the SMF may immediately perform operation 5. When not allowed, the SMF may wait for reception of a new AF request from the AF. A maximum value of a waiting time may be determined according to the internal policy.

In operation 2-1, the AF may perform migration of data needed for providing a service to a UE from MEC 1 to MEC 2 (e.g., a virtual machine image, a service-related context).

In operation 3, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 4, a new PDU session may be created according to the SSC Mode 2 procedure.

In operation 5, a new PDU session may be created according to the SSC Mode 2 procedure.

In operation 6, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the SMF may also transmit a previous UE address.

In operation 6-1, the AF may modify a service connection by using the received new address of the UE.

Fourteenth Embodiment

The fourteenth embodiment of the disclosure is for describing a method and procedure for supporting migration corresponding to FIG. 4. The fourteenth embodiment relates to a method of using the SSC Mode 3 procedure in the thirteenth embodiment described above. In the embodiment, a factor used in an AF influence on traffic routing request of the fourteenth embodiment may be identical to that of the thirteenth embodiment.

Figure 22:
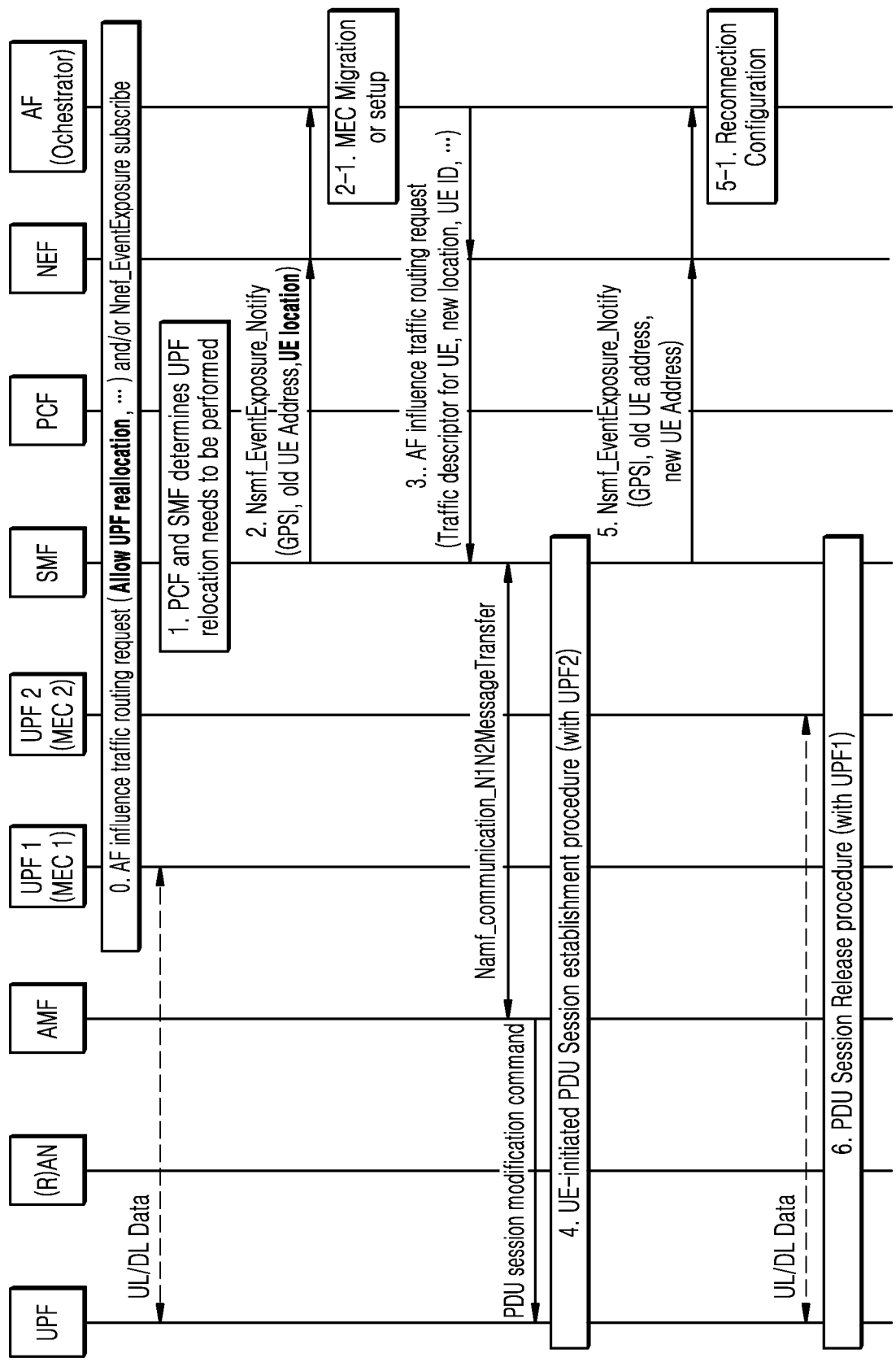
FIG. 22 is a diagram illustrating a method of using a factor indicating whether a modification of a UPF is allowed and using SSC MODE3 and modifying a PDU session according to a request from an AF when migration of the AF is completed, according to an embodiment.

FIG. 22 is a diagram illustrating a method of modifying a PDU session migration procedure according to the fourteenth embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC1 by using RAN 1 and UPF 1.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, when a modification of a UPF is allowed in an initially received AF request, the SMF may immediately perform operation 5. When not allowed, the SMF may wait for reception of a new AF request from the AF. A maximum value of a waiting time may be determined according to the internal policy.

In operation 2-1, the AF may perform migration of data needed for providing a service to a UE from MEC 1 to MEC 2 (e.g., a virtual machine image, a service-related context).

In operation 3, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 4, the SMF may receive a new AF influence on traffic routing request from the AF. Here, a new PDU session may be created according to the SSC Mode 3 procedure.

In operation 5, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the SMF may also transmit a previous UE address.

In operation 5-1, the AF may modify a service connection by using the received new address of the UE.

In operation 6, the PDU session may be modified and the previous PDU session may be released according to the SSC Mode 3 procedure.

Fifteenth Embodiment

The fifteenth embodiment of the disclosure is for describing a method and procedure for supporting migration corresponding to FIG. 4. The fifteenth embodiment relates to a method of explicitly transmitting a period of time for the SMF to wait for a modification of a PDU session when the SMF additionally transmits a notification to the AF in the above-described fourteenth embodiment. In the embodiment, the AF that has received a notification on a modification of a path may send a response to the 5G system (5GS) by using two kinds of methods. A first possible responding method is, when the content of a previous AF influence on traffic routing request is modified according to a path change of a user equipment, transmitting a new request or updating the previous request. A second possible responding method may be, when a previous AF influence on traffic routing request does not need to be modified, transmitting a response (Ack) to the notification. In the embodiment, a factor used in an AF influence on traffic routing request of the fifteenth embodiment may be identical to that of the thirteenth embodiment.

Figure 23:
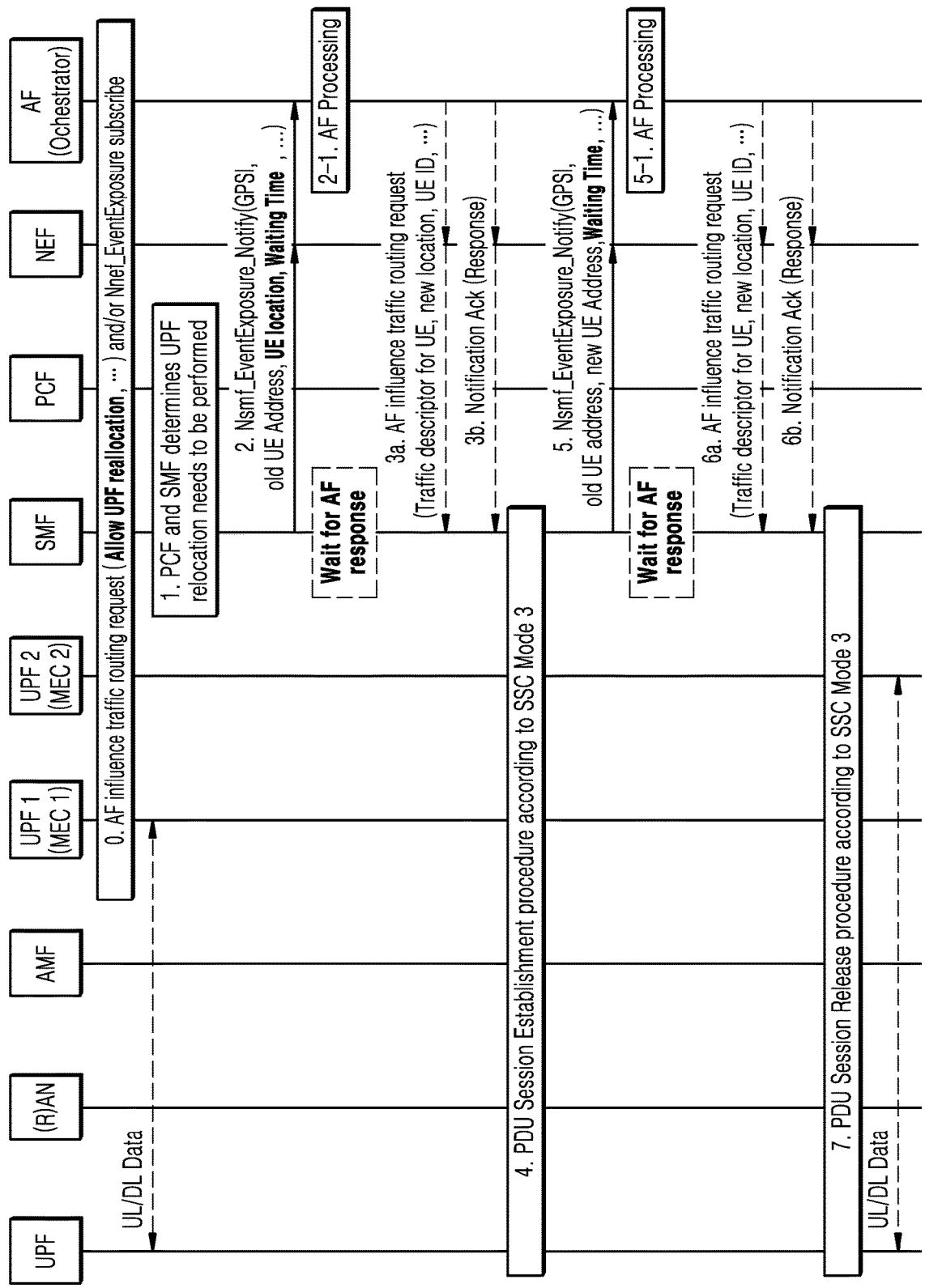
FIG. 23 is a diagram illustrating a method of modifying an SSC MODE3-based PDU session migration procedure by using a response of an AF, according to an embodiment.

FIG. 23 is a diagram illustrating a method of modifying a PDU session migration procedure according to the fifteenth embodiment, according to a request from the AF.

In operation 0, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC 1 by using RAN 1 and UPF 1. In the disclosure, a "modification of a UPF" may include, for example, configuring a new UPF or activating a connection to a new UPF. For example, a "modification of a UPF" may include configuring a new UPF after the SMF transmits an early notification to the AF. Alternatively, a "modification of a UPF" may include configuring, by the SMF, a new UPF and transmitting a late notification to the AF and then activating a connection to the new UPF. Accordingly, an operation of determining, performed by the SMF, whether to wait for a response from the AF, according to "whether UPF modification is allowed," may apply to both a procedure related to an early notification and a procedure related to a late notification.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, and the GPSI or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, the SMF may determine whether to a modification of a UPF is allowed, by considering information indicating whether a modification of UPF is allowed, the information being received in the AF request, AF characteristics, and the internal policy. When a modification of a UPF is allowed according to the determination by the SMF, the SMF may immediately perform operation 5. When not allowed, the SMF may wait for reception of a new AF request from the AF. A maximum value of a waiting time may be determined according to the internal policy. In the notification, a period of time for the SMF to wait for a response from the AF according to the internal policy may be included.

In operation 2-1, the AF may perform migration of data needed for providing a service to a UE from MEC 1 to MEC 2 (e.g., a virtual machine image or a service-related context).

In operation 3a, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 3b, when a modification of a previous AF influence on traffic routing is not necessary (for example, when "whether UPF modification is allowed" is "not allowed," and a modification to "allowed" is not necessary), and the NEF and the SMF support a response (ACK) to a notification regarding the modification of the UPF, the AF may transmit information indicating that the AF is ready for the modification of the UPF, to the SMF via ACK. In the embodiment, when it is not possible to complete operation 2-1 within the waiting time of the SMF received in operation 2, a negative response (NACK) may be transmitted.

Operations 3a and 3b may be selectively performed according to the decision by the AF.

In operation 4, the SMF may receive a new AF influence on traffic routing request or a response (ACK) from the AF. Here, a new PDU session may be created according to the SSC Mode 3 procedure.

In operation 5, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the SMF may also transmit a previous UE address. Obviously, as described above with reference to operation 2, based on the information indicating whether a modification of a UPF is allowed, received in the AF request, when a modification of a UPF is allowed, the SMF may immediately perform operation 7, or when a modification of a UPF is not allowed, the SMF may wait for reception of a response from the AF. Moreover, the SMF may transmit a period of time for the SMF to wait for a response from AF, according to the internal policy.

In operation 5-1, the AF may modify a service connection by using the received new address of the UE.

In operation 6a, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 6b, when a modification of a previous AF influence on traffic routing is not necessary (for example, when "whether UPF modification is allowed" is "not allowed," and a modification to "allowed" is not necessary), and the NEF and the SMF support a response (ACK) to a notification regarding the modification of the UPF, the AF may transmit information indicating that the AF is ready for the modification of the UPF, to the SMF via ACK. In the embodiment, when it is not possible to complete operation 5-1 within the waiting time of the SMF received in operation 5, a negative response (NACK) may be transmitted.

Operations 6a and 6b may be selectively performed according to the decision by the AF.

In operation 7, the PDU session to be used may be modified and the previous PDU session may be released according to the SSC Mode 3 procedure.

According to an embodiment of the disclosure, in the fifteenth embodiment, SSC Mode 2 may be used. For example, in the fifteenth embodiment, operation 7 may be continuously performed after operation 4.

Sixteenth Embodiment

The sixteenth embodiment of the disclosure is for describing a method and procedure for supporting migration corresponding to FIG. 4. The sixteenth embodiment includes a process in which the AF may obtain a period of time for the SMF to wait for a response from the AF, in a process of requesting AF influence on traffic routing and receiving a response. In the embodiment, a factor used in an AF influence on traffic routing request of the sixteenth embodiment may be identical to that of the thirteenth embodiment.

Figure 24:
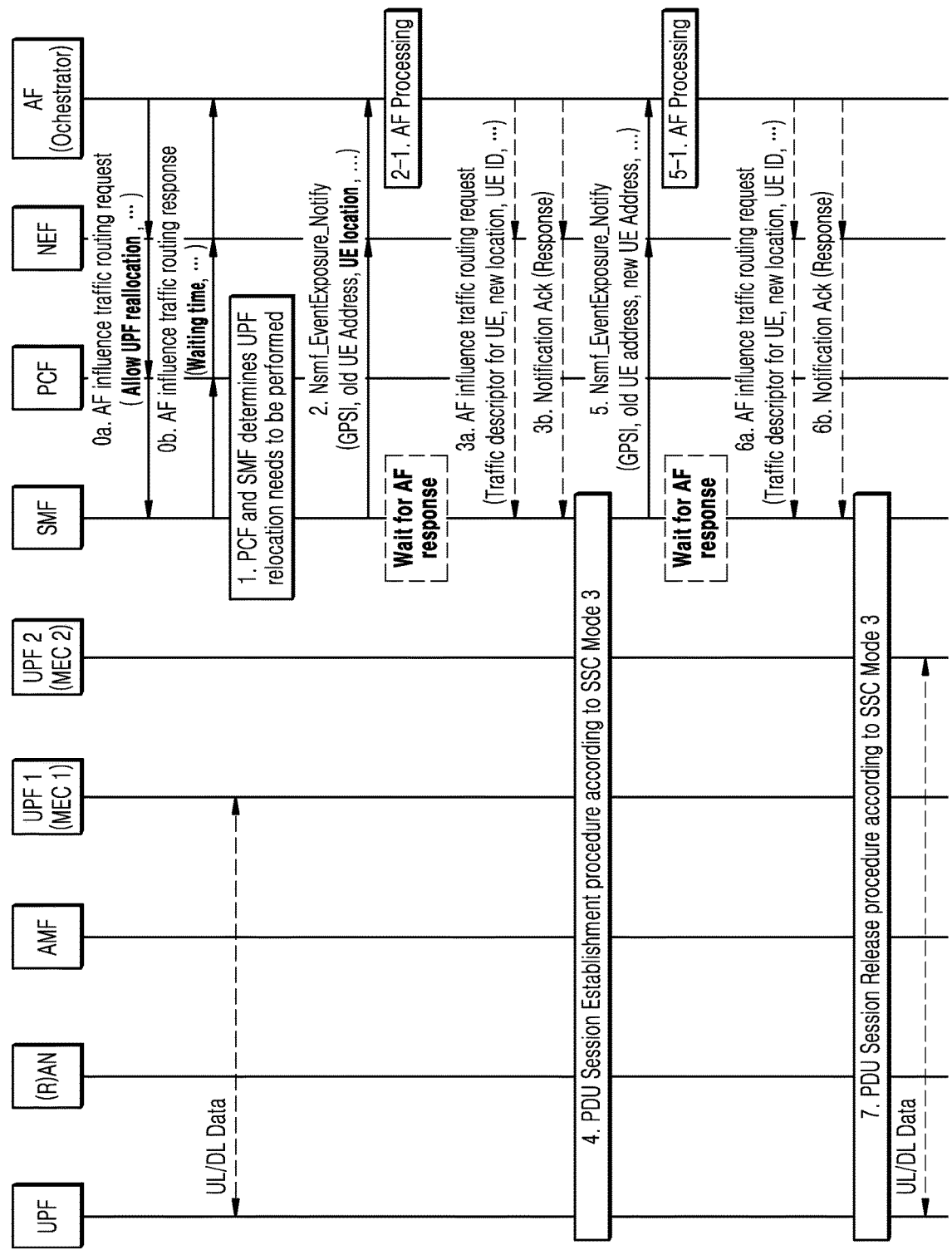
FIG. 24 is a diagram illustrating a method of modifying an SSC MODE3-based PDU session migration procedure by using a response of an AF, according to an embodiment.

FIG. 24 is a diagram illustrating a method of modifying a PDU session migration procedure according to the sixteenth embodiment, according to a request from the AF.

In operation 0a, the AF may transmit an AF influence on traffic routing request to the SMF via an NEF with respect to a particular user equipment or service flow. Here, the AF may explicitly transmit information indicating whether a UPF is to be modified (Allow reallocation of UPF). When the AF request is successfully reflected, the user equipment may use a service located in MEC1 by using RAN 1 and UPF 1.

In operation 0b, the SMF may also transmit, in a response message to the AF, a maximum period of time for the SMF to wait for a response from the AF when a modification of a UPF occurs.

In operation 1, a PCF and the SMF may recognize the necessity for a modification of a UPF according to movement of the user equipment, from internal policy and a request from the AF.

In operation 2, the SMF may transmit an early notification related to the modification of the UPF to the AF. Here, the SMF may transmit a GPSI of a related UE and an address of a current UE. Also, the SMF may additionally transmit a location of the current UE. The GPSI may be used to identify an UE by the AF, or an external ID or MSISDN may be transmitted. The location of the UE may be an additional factor that is selectively transmitted to the AF to optimize a path between DNAI and DN. By using this, the AF may find out whether migration of MEC is necessary. Furthermore, in an MEC node or an intermediate transmission network, a path between the user equipment and MEC may be optimized.

Here, the SMF may determine whether a modification of a UPF is allowed, by considering information indicating whether a modification of UPF is allowed, the information being received in an initial AF request, AF characteristics, and the internal policy. When a modification of a UPF is allowed according to the determination by the SMF, the SMF may immediately perform operation 5. When not allowed, the SMF may wait for reception of a new AF request from the AF. A maximum value of a waiting time may be determined according to the internal policy. When the maximum waiting time transmitted in operation 0b is different, a new maximum waiting time may be included in the notification.

In operation 2-1, the AF may perform migration of data needed for providing a service to a UE from MEC 1 to MEC 2 (e.g., a virtual machine image or a service-related context).

In operation 3a, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 3b, when a modification of a previous AF influence on traffic routing is not necessary (for example, when "whether UPF modification is allowed" is "not allowed," and a modification to "allowed" is not necessary), and the NEF and the SMF support a response (ACK) to a notification according to the modification of the UPF, the AF may transmit information indicating that the AF is ready for the modification of the UPF, to the SMF via ACK. In the embodiment, when it is not possible to complete operation 2-1 within the waiting time of the SMF received in operation 2, a negative response (NACK) may be transmitted.

Operations 3a and 3b may be selectively performed according to the decision by the AF.

In operation 4, the SMF may receive a new AF influence on traffic routing request or a response (ACK) from the AF. Here, a new PDU session may be created according to the SSC Mode 3 procedure.

In operation 5, the SMF may notify the AF of a new address of the UE. Here, the SMF may allow to reconfigure a previous connection by using a new address, for example, a user equipment address allocated in UPF2, with respect to a connection to a UE corresponding to the GPSI. Additionally, the SMF may also transmit a previous UE address. Obviously, as described above with reference to operation 2, based on the information indicating whether a modification of a UPF is allowed, received in the AF request, when a modification of a UPF is allowed, the SMF may immediately perform operation 7, or when a modification of a UPF is not allowed, the SMF may wait for reception of a response from the AF.

In operation 5-1, the AF may modify a service connection by using the received new address of the UE.

In operation 6a, when migration of services is completed, the AF may transmit a new AF influence on traffic routing request or update a previous request. When transmitting a new AF request, in order not to affect other user equipment, the AF may limit a target by using a target UE identifier. In the case of updating, the AF may designate a previous AF request to be updated, by using an AF transaction identifier.

In operation 6b, when a modification of a previous AF influence on traffic routing is not necessary (for example, when "whether UPF modification is allowed" is "not allowed," and a modification to "allowed" is not necessary), and the NEF and the SMF support a response (ACK) to a notification regarding the modification of the UPF, the AF may transmit information indicating that the AF is ready for the modification of the UPF, to the SMF via ACK. In the embodiment, when it is not possible to complete operation 5-1 within the waiting time of the SMF received in operation 2, a negative response (NACK) may be transmitted.

Operations 6a and 6b may be selectively performed according to the decision by the AF.

In operation 7, the PDU session may be modified and the previous PDU session may be released according to the SSC Mode 3 procedure.

According to an embodiment of the disclosure, in the sixteenth embodiment, SSC mode 2 may be used. For example, in the sixteenth embodiment, operation 7 may be continuously performed after operation 4.

According to the apparatus and method of various embodiments of the disclosure, when a user equipment using a 5G mobile communication system changes a node in an environment in which the user equipment is provided with a service via a distributed mobile edge computing node, disconnection of services may be prevented.

Also, according to the disclosure, user equipments of vehicles may be provided with high-quality services via optimum service nodes while modifying distributed V2X servers according to locations of the vehicles and network conditions, without being disconnected. A user equipment of a vehicle may be an apparatus embedded in the vehicle or a user equipment attached to the vehicle, such as a smartphone or a black box. Also, the method of migrating a mobile edge cloud, according to the embodiment of the disclosure, is also applicable to other vertical services than V2X, which is readily understood by one of ordinary skill in the art. A V2X service provider (SP) according to an embodiment of the disclosure may provide 5G-specializd services.

Figure 25:
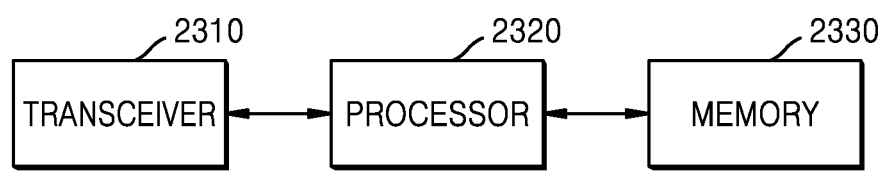
FIG. 25 is a block diagram illustrating a structure of an entity according to an embodiment.

FIG. 25 is a block diagram illustrating a structure of an entity according to an embodiment.

Referring to FIG. 25, the entity may include a transceiver 2310, a processor 2320, and a memory 2330. In the disclosure, the processor 2320 may be defined as a circuit or an application-specific integrated circuit or at least one processor. However, elements of the entity are not limited to the above example. For example, the entity may include more elements or fewer elements than the above-described elements. Moreover, the transceiver 2310, the processor 2320, and the memory 2330 may be implemented as a single chip.

The transceiver 2310 may transmit or receive a signal to or from other network entities. For example, the transceiver 2310 may transmit system information to a user equipment, and may transmit a synchronization signal or a reference signal.

The processor 2320 may control overall operations of an entity according to an embodiment proposed in the disclosure. For example, the processor 2320 may control a signal flow between blocks such that operations described with reference to the above-described drawings are performed.

The memory 2330 may store at least one of information transmitted or received via the transceiver 2310 described above or information generated in the processor 2320. Also, the memory 2330 may store control information or data included in a signal acquired by a base station. The memory 2330 may be configured in a storage medium, such as read-only memory (ROM), random access memory (RAM), a hard disk, compact disc-ROM (CD-ROM), or digital versatile disc (DVD), or a combination thereof. Also, the memory 2330 may be configured in a plurality of memories. In an embodiment, the memory 2330 may store a program for supporting a beam-based cooperative communication.

The methods according to the embodiments described in the claims or specification of the disclosure may be implemented in the form of hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to embodiments as described in the claims or the specification of the disclosure.

The programs (e.g., software modules or software) may be stored in a random access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), other types of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wide LAN (WLAN), or a storage area network (SAN), or a combination thereof. The storage device may be connected through an external port to an apparatus performing the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation, and the disclosure is not limited thereto. As such, an element expressed in a plural form may also be configured as a single element, and an element expressed in a singular form may also be configured as plural elements.

Meanwhile, the embodiments of the disclosure disclosed in the present specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the embodiments described above may be combined with each other as required. Also, the embodiments may also apply to other systems, for example, an LTE system, a 5G or NR system, or the like.

The invention claimed is:

1. A method, performed by a Session Management Function (SMF), of controlling a path between an Application Function (AF) and a user equipment in a wireless communication system, the method comprising:
receiving, from the AF, an AF request message including information indicating whether User Plane Function (UPF) modification is allowed;
determining whether a modification of a UPF in the path between the AF and the user equipment is required;
transmitting a notification including information associated with the modification of the UPF to the AF, based on a result of the determining whether the modification of the UPF is required;
determining whether to wait for reception of a response message from the AF for a certain period of time, based on the information indicating whether UPF modification is allowed; and
controlling a modification of the path between the AF and the user equipment, the path including the UPF, based on a result of the determining whether to wait.

2. The method of claim 1, further comprising identifying a response of the AF as NACK, based on the information indicating whether UPF modification is allowed, in case that the response message is not received from the AF for the certain period of time.

3. The method of claim 1, further comprising:
receiving the response message corresponding to the notification from the AF,
wherein the receiving of the response message comprises:
receiving an ACK message from the AF in case that mobile edge computing (MEC) migration is completed within the certain period of time, and
receiving a NACK message from the AF in case that the MEC migration is not completed within the certain period of time.

4. The method of claim 1,
wherein the certain period of time is a maximum waiting time to wait for reception of the response message from the AF, and
wherein the notification comprises information indicating the certain period of time.

5. The method of claim 1,
wherein the response message from the AF is directly transmitted from the AF to the SMF or transmitted to the SMF via a Network Exposure Function (NEF), and
wherein the response message from the AF is transmitted not via a Policy Control Function (PCF).

6. The method of claim 1,
wherein the notification comprises at least one of an early notification or a late notification,
wherein the early notification is transmitted to the AF before a new path is configured between the AF and the user equipment, and
wherein the late notification is transmitted to the AF after a new path is configured between the AF and the user equipment.

7. The method of claim 6,
wherein the notification comprises the early notification, and
wherein the controlling of the modification of the path between the AF and the user equipment comprises not modifying the UPF during the certain period of time, based on the information indicating whether UPF modification is allowed.

8. The method of claim 6,
wherein the notification comprises the late notification, and
wherein the controlling of the modification of the path between the AF and the user equipment comprises not activating a protocol data unit (PDU) session via a modified UPF during the certain period of time, based on the information indicating whether UPF modification is allowed.

9. A Session Management Function (SMF) for controlling a path between an Application function (AF) and a user equipment in a wireless communication system, the SMF comprising:
a transceiver;
a memory; and
at least one processor configured to:
control the transceiver to receive, from the AF, an AF request message including information indicating whether User Plane Function (UPF) modification is allowed,
determine whether a modification of a UPF in the path between the AF and the user equipment is required,
control the transceiver to transmit a notification including information associated with the modification of the UPF to the AF, based on a result of the determining whether the modification of the UPF is required,
   determine whether to wait for reception of a response message from the AF for a certain period of time, based on the information indicating whether UPF modification is allowed, and
   control a modification of the path between the AF and the user equipment, the path including the UPF, based on a result of the determining whether to wait.

10. The SMF of claim 9, wherein the at least one processor is further configured to:
   control the transceiver to receive the response message corresponding to the notification from the AF;
   control the transceiver to receive an ACK message from the AF in case that mobile edge computing (MEC) migration is completed within the certain period of time; and
   control the transceiver such that the transceiver receives a NACK message from the AF in case that the MEC migration is not completed within the certain period of time.

11. The SMF of claim 9,
   wherein the certain period of time is a maximum waiting time to wait for reception of the response message from the AF, and
   wherein the notification comprises information indicating the certain period of time.

12. The SMF of claim 9,
   wherein the response message from the AF is directly transmitted from the AF to the SMF or transmitted to the SMF via a Network Exposure Function (NEF), and
   wherein the response message from the AF is transmitted not via a Policy Control Function (PCF).

13. The SMF of claim 9,
   wherein the notification comprises at least one of an early notification or a late notification,
   wherein the early notification is transmitted to the AF before a new path is configured between the AF and the user equipment, and
   wherein the late notification is transmitted to the AF after a new path is configured between the AF and the user equipment.

14. The SMF of claim 13,
   wherein the notification comprises the early notification, and
   wherein the at least one processor is further configured to control not to modify the UPF during the certain period of time, based on the information indicating whether UPF modification is allowed.

15. The SMF of claim 13,
   wherein the notification comprises the late notification, and
   wherein the at least one processor is further configured to control not to activate a protocol data unit (PDU) session via a modified UPF during the certain period of time, based on the information indicating whether UPF modification is allowed.

* * * * *